(12) United States Patent
Neff et al.

(10) Patent No.: US 11,804,745 B2
(45) Date of Patent: Oct. 31, 2023

(54) MULTI-LAYER PRINTED COIL ARRANGEMENT HAVING VARIABLE-PITCH PRINTED COILS

(71) Applicant: Systems, Machines, Automation Component Corporation, Carlsbad, CA (US)

(72) Inventors: Edward A. Neff, Carlsbad, CA (US); Toan Vu, Carlsbad, CA (US); Vinh Hoang, Carlsbad, CA (US)

(73) Assignee: Systems, Machines, Automation Components Corporation, Carlsbad, CA (US)

( * ) Notice: Subject to any disclaimer, the term of this patent is extended or adjusted under 35 U.S.C. 154(b) by 315 days.

(21) Appl. No.: 17/170,759

(22) Filed: Feb. 8, 2021

(65) Prior Publication Data

US 2021/0257870 A1    Aug. 19, 2021

Related U.S. Application Data

(60) Provisional application No. 62/971,848, filed on Feb. 7, 2020.

(51) Int. Cl.
*H02K 3/04* (2006.01)
*H02K 7/00* (2006.01)
(Continued)

(52) U.S. Cl.
CPC ............... *H02K 3/04* (2013.01); *H02K 5/04* (2013.01); *H02K 7/003* (2013.01); *H02K 15/0407* (2013.01); *H02P 25/03* (2016.02)

(58) Field of Classification Search
CPC .......... H02K 21/12; H02K 5/04; H02K 11/21; H02K 15/0407; H02K 7/003; H02K 3/04;
(Continued)

(56) References Cited

U.S. PATENT DOCUMENTS 4,804,574 A * 2/1989 Osawa .................. H02K 5/225
428/209
4,962,329 A 10/1990 Fujita et al.
(Continued)

FOREIGN PATENT DOCUMENTS

WO   WO-2014181451 A1   11/2014
WO   WO 2021/159114 A1   8/2021

OTHER PUBLICATIONS

International Search Report and Written Opinion for International Application No. PCT/US2021/17143, dated Jun. 30, 2021, 13 pages.
(Continued)

*Primary Examiner* — Leda T Pham
(74) *Attorney, Agent, or Firm* — Cooley LLP

(57) ABSTRACT

A printed coil assembly including a flexible dielectric material, a patterned top conductive layer formed on a top surface of the flexible dielectric material, and a patterned bottom conductive layer formed on a bottom surface of the flexible dielectric material. The patterned top conductive layer and the patterned bottom conductive layer form a plurality of printed coils arranged in a plurality of printed coil rollers concentrically arranged in a cylindrical shape. Each of the plurality of printed coils includes a top layer printed coil disposed within the patterned top conductive layer and a bottom layer printed coil disposed within the patterned bottom conductive layer. Coil pitches of the coils within each roller are chosen such that corresponding ones of the plurality of printed coils in adjacent rollers are axially aligned relative to a center of the cylindrical shape.

20 Claims, 22 Drawing Sheets

(51) Int. Cl.
*H02P 25/03* (2016.01)
*H02K 15/04* (2006.01)
*H02K 5/04* (2006.01)

(58) Field of Classification Search
CPC ...... H02K 3/26; H02K 11/215; H02K 13/006; H02K 23/58; H02K 3/28; H02P 25/03; H02P 25/16
See application file for complete search history.

(56) References Cited

U.S. PATENT DOCUMENTS

| | | | |
|---|---|---|---|
| 5,349,543 A | 9/1994 | Buliszyn et al. | |
| 5,952,589 A | 9/1999 | Leung et al. | |
| 6,229,230 B1 | 5/2001 | Wing | |
| 6,686,824 B1 | 2/2004 | Yamamoto | |
| 10,778,071 B2 * | 9/2020 | Kim | H02K 3/26 |
| 2002/0185919 A1 | 12/2002 | Botos et al. | |
| 2004/0145249 A1 | 7/2004 | Brown | |
| 2007/0296369 A1 * | 12/2007 | Yeh | H01F 5/003 336/200 |
| 2009/0079531 A1 | 3/2009 | Zach et al. | |
| 2010/0289345 A1 | 11/2010 | Sakai et al. | |
| 2013/0009511 A1 | 1/2013 | Dieleman | |
| 2014/0159514 A1 | 6/2014 | Neff et al. | |
| 2016/0329798 A1 | 11/2016 | Himmelmann | |
| 2018/0374630 A1 | 12/2018 | Morita et al. | |
| 2019/0273422 A1 * | 9/2019 | Kim | H02K 21/24 |
| 2020/0259406 A1 | 8/2020 | Neff et al. | |

OTHER PUBLICATIONS

International Preliminary Examination Report for Application No. PCT/US2021/017143, dated Aug. 18, 2022, 11 pages.

* cited by examiner

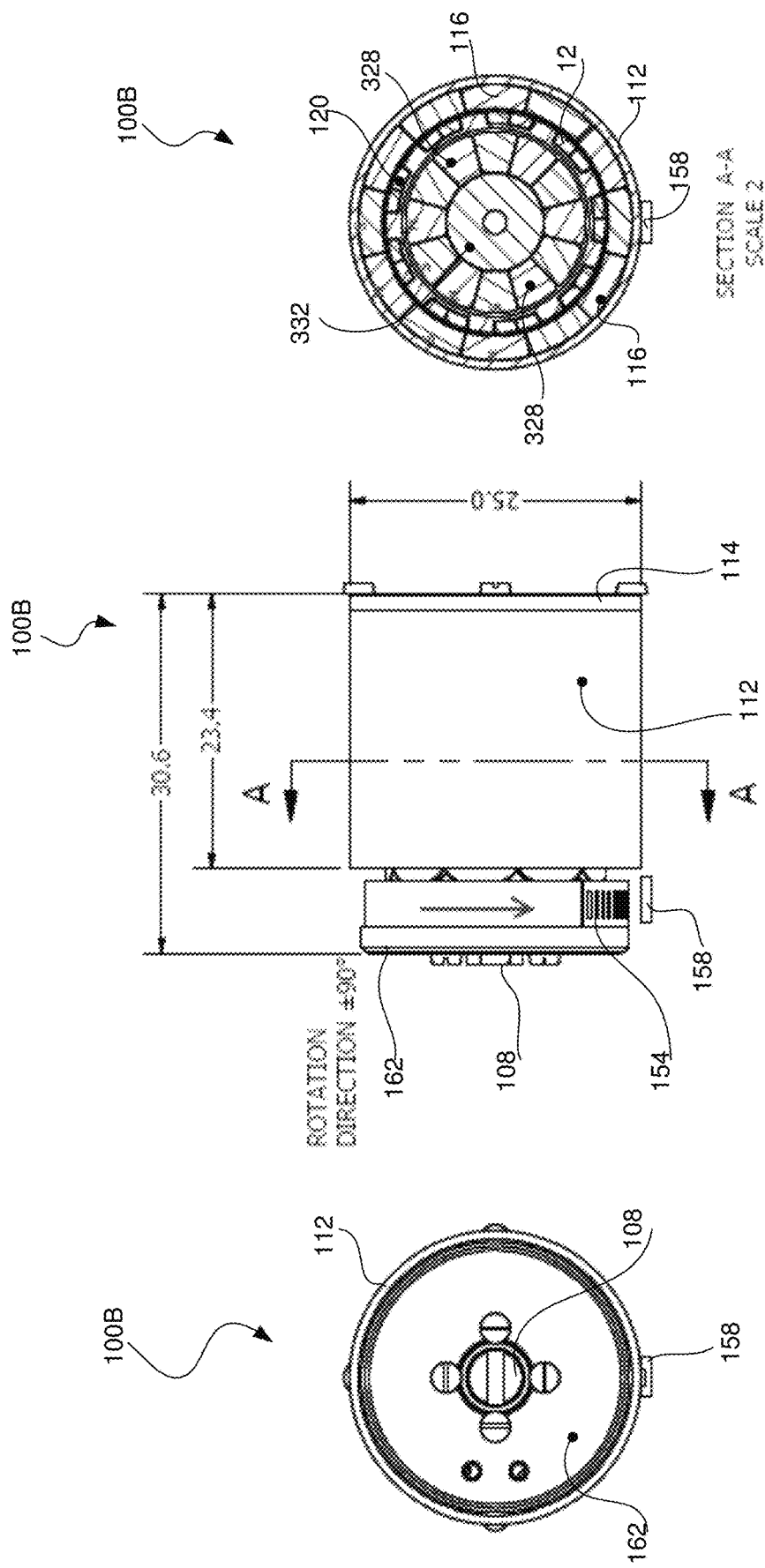

Pole pitch: 6 pole pair
Pole pitch angle: 60 degree

C : coil
R : roller
n : coil number, o = n+1; s = o +1
p: roller number
U,V,W : coils terminal

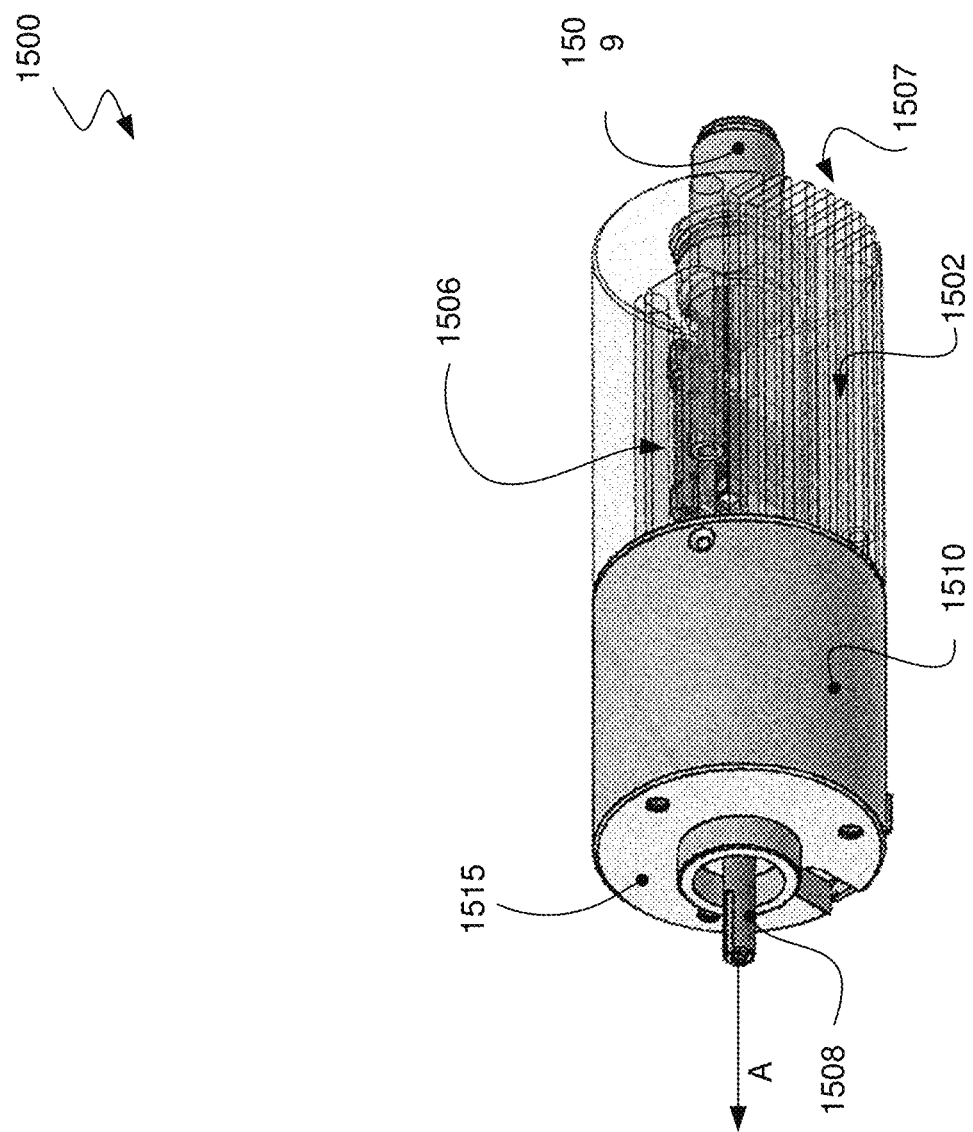

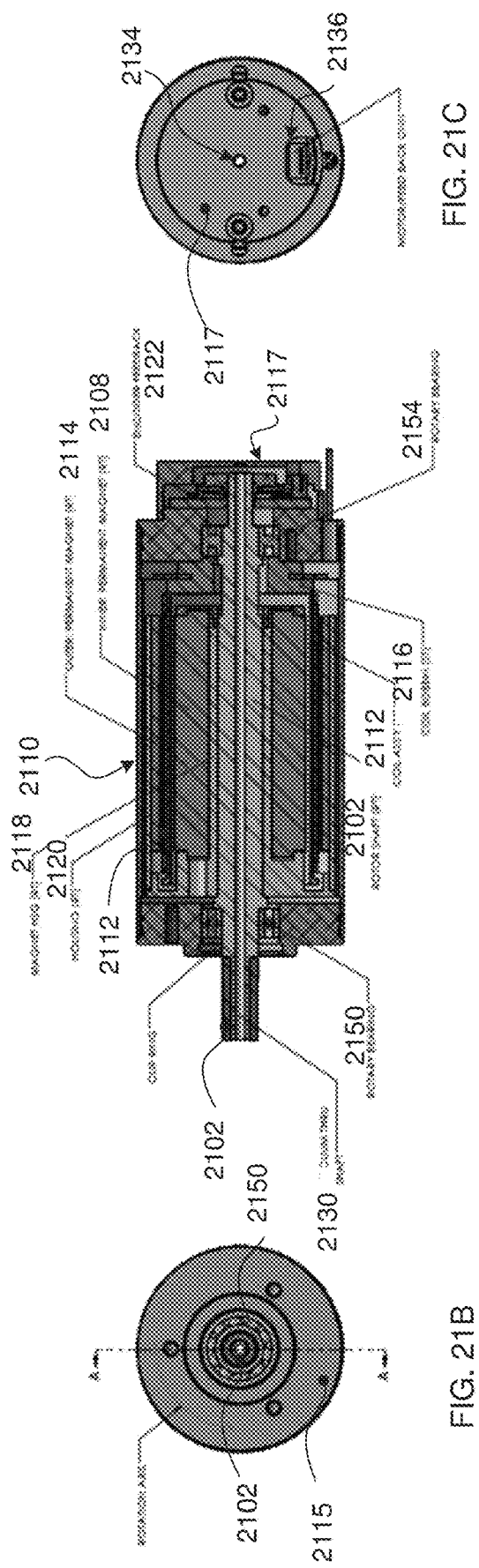
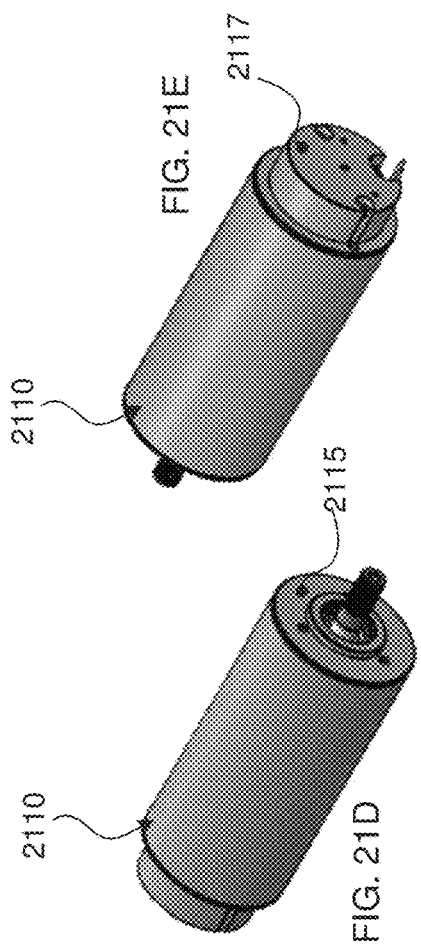
FIG. 21A
FIG. 21B
FIG. 21C
FIG. 21D
FIG. 21E

MULTI-LAYER PRINTED COIL ARRANGEMENT HAVING VARIABLE-PITCH PRINTED COILS

CROSS REFERENCE TO RELATED APPLICATIONS

This application claims priority to and the benefit of U.S. Provisional Patent Application No. 62/971,848, entitled ACTUATOR SYSTEM INCLUDING VARIABLE-PITCH PRINTED COILS, filed on Feb. 7, 2020, the disclosure of which is incorporated herein by reference in its entirety for all purposes.

FIELD

This disclosure relates generally to electromagnetic actuators and, more particularly, to coils for such actuators.

BACKGROUND

Moving coil technology works in both rotary and linear motors actuators. Within a moving coil actuator are permanent magnets generating a magnetic field. A moving coil resides in that field. Passing current through the coil generates transverse motion of the coil and an output shaft or shuttle to which the coil is coupled. The force of that output is proportional to the number of coils turns and the magnetic flux within the actuator as well as to the current. Providing more current through the coil thus increases output force.

The introduction of high-strength neodymium magnets has greatly expanded the applicability of moving-coil actuators in motion applications since actuators with these magnets are capable of outputting a high force (or torque). The light moving mass of their coils make the actuators excel in many industrial applications because this allows, for example, high cycle rates—up to twice that of pneumatic or ball screw actuators. In addition, moving-coil actuators have long cycle life (up to 10 times that of pneumatic or ball screw linear actuators), and high repeatability over each cycle.

However, wider implementation of moving coil actuators has been limited by their high cost relative to actuators using pneumatic cylinders or actuators incorporating stepper-motor-based ball screw technologies.

SUMMARY

In one aspect the disclosure is directed to a printed coil assembly including a flexible dielectric material, a patterned top conductive layer formed on a top surface of the flexible dielectric material, and a patterned bottom conductive layer formed on a bottom surface of the flexible dielectric material. The patterned top conductive layer and the patterned bottom conductive layer form a plurality of printed coils arranged in a plurality of printed coil rollers disposed to be concentrically arranged in a cylindrical shape. Each of the plurality of printed coils includes a top layer printed coil disposed within the patterned top conductive layer and a bottom layer printed coil disposed within the patterned bottom conductive layer. A first coil pitch of a first set of the plurality of printed coils within a first roller of the printed coil rollers is less than a second coil pitch of a second set of the plurality of printed coils within a second roller of the plurality of rollers such that corresponding ones of the plurality of printed coils in the first and second rollers are axially aligned relative to a center of the cylindrical shape.

The disclosure also relates to a printed coil arrangement which includes a flexible circuit material rolled into concentric printed coil rollers. Each of the plurality of concentric printed coil rollers includes a plurality of printed coils. A pitch of the plurality of printed coils within each one of the plurality of printed coil rollers is different from a pitch of the plurality of printed coils within any other of the plurality of printed coil rollers. The pitches of the printed coils within each of the plurality of coil rollers are selected such that corresponding ones of the plurality of printed coils in each of the plurality of printed coil rollers are axially aligned relative to a center of a cylindrical shape into which the flexible circuit material is rolled. The printed coil arrangement further includes a bobbin and an adhesive layer. The adhesive layer is attached to an outer surface of the bobbin and a bottom surface of an innermost one of the plurality of concentric printed coil rollers.

In another aspect the disclosure pertains to a method of fabricating a printed coil arrangement. The method includes applying, to a top conductive layer of a flexible circuit material and to a bottom conductive layer of a flexible circuit material, one or more masks defining a desired printed coil circuit pattern where the desired printed coil circuit pattern includes multiple rollers having printed coils of variable pitch. The flexible circuit material further includes a flexible dielectric layer sandwiched between the top conductive layer and the bottom conductive layer. The method further includes exposing unmasked portions of the top conductive layer of the flexible circuit material and the bottom conductive layer of the flexible circuit material to acid and removing the unmasked portions of the top conductive layer and the bottom conductive layer. Additional masks are applied to the unmasked portions of the top conductive layer and the bottom conductive layer. The method further includes plating additional conductive material onto the desired printed coil pattern and covering a conductive trace resulting from the plating with a printed screen. One of gold and a different conductive material is then plated onto the additional conductive material of the conductive trace.

The disclosure further pertains to a method of fabricating a printed coil arrangement. The method includes etching a flexible circuit material into a plurality of coil rollers wherein each of the plurality of coil rollers includes a plurality of printed coils and wherein a pitch of the plurality of printed coils within each one of the plurality of printed coil rollers is different from a pitch of the plurality of printed coils within any other of the plurality printed coil rollers. The pitches of the printed coils within each of the plurality of coil rollers are selected such that corresponding ones of the plurality of printed coils in each of the plurality of printed coil rollers are axially aligned relative to a center of a cylindrical shape into which the flexible circuit material is rolled. The method further includes applying an adhesive material to a bottom surface of the flexible circuit material. A first coil roller of the plurality of printed coil rollers is positioned on an outer surface of a bobbin and the first coil roller is bonded to the outer surface using the adhesive material. The remaining rollers of the plurality of printed coil rollers are then rolled onto the first coil roller. Adjacent printed coil rollers of the plurality of printed coil rollers are bonded to each other using the adhesive material, thereby creating a rolled and bonded printed coil circuit. The method further includes curing the rolled and bonded printed coil circuit in an oven.

In another aspect the disclosure is directed to a direct drive brushless motor including a plurality of rotational components having a center rotation shaft circumscribed by a plurality of coils and a coil termination plate configured to support the plurality of coils. The plurality of coils includes a plurality of printed coils arranged in multiple coil rollers wound around a bobbin wherein a first pitch of a first set of the plurality of printed coils included within a first of the multiple coil rollers is different from a second pitch of a second set of the plurality of coil rollers included within a second of the multiple coil rollers. A plurality of non-rotational components include a plurality of inner magnets and a plurality of outer magnets wherein the plurality of outer magnets are positioned around the plurality of coils. A flex cable has one or more leads for providing electrical current to one or more of the plurality of coils without the use of brushes.

This disclosure also concerns a direct drive brushless motor including a plurality of outer magnets arranged as a first Halbach cylinder. A coil assembly includes a plurality of coils surrounded by the plurality of outer magnets wherein the plurality of coils are connected without the use of brushes to an external source of electrical current. The coil assembly is disposed to rotate relative to the plurality of outer magnets. The plurality of coils include a plurality of printed coils arranged in multiple coil rollers wherein a first pitch of a first set of the plurality of printed coils included within a first of the multiple coil rollers is different from a second pitch of a second set of the plurality of coil rollers included within a second of the multiple coil rollers. A plurality of inner magnets are arranged as a second Halbach cylinder and surrounded by the plurality of coils. The motor further includes a core element surrounded by the plurality of inner magnets and a center rotation shaft positioned within an interior space circumscribed by the core element.

In yet another aspect the disclosure is directed to an apparatus for use with a brushless motor. The apparatus includes a coil assembly having a plurality of printed coils included within multiple coil rollers of a multi-layer cylindrical coil arrangement wherein a first pitch of a first set of the plurality of printed coils included within a first roller of the multiple coil rollers is different from a second pitch of a second set of the plurality of coil rollers included within a second roller of the multiple coil rollers. The first roller forms a first layer of the multi-layer cylindrical coil arrangement and the second roller forms a second layer of the multi-layer cylindrical coil arrangement. The apparatus further includes a rotor having a plurality of outer magnets configured as a first Halbach cylinder surrounding the coil assembly and an outer magnet housing coupled to the plurality of outer magnets where the outer magnet housing surrounds the plurality of outer magnets. The rotor further includes a plurality of inner magnets arranged as a second Halbach cylinder wherein the coil assembly is interposed between the plurality of inner magnets and the plurality of outer magnets. An inner magnet housing of the rotor is coupled to the plurality of inner magnets. The rotor additionally includes an output shaft surrounded by the inner magnet housing.

Also disclosed herein is a printed coil including a flexible dielectric material and a patterned top conductive layer formed on a top surface of the flexible dielectric material. A patterned bottom conductive layer is formed on a bottom surface of the flexible dielectric material. A plurality of printed coils are arranged in a plurality of printed coil rollers disposed to be concentrically arranged in a cylindrical shape. Each of the plurality of printed coils includes a top layer printed coil disposed within the patterned top conductive layer and a bottom layer printed coil disposed within the patterned bottom conductive layer. A first coil pitch of a first set of the plurality of printed coils within a first roller of the printed coil rollers is less than a second coil pitch of a second set of the plurality of printed coils within a second roller of the plurality of rollers such that corresponding ones of the plurality of printed coils in the first and second rollers are axially aligned relative to a center of the cylindrical shape.

The top layer printed coil and the bottom layer printed coil within each of the plurality of printed coils are electrically connected through a top layer conductor extending through a via defined by the dielectric layer.

It is to be understood that both the foregoing general description and the following detailed description are exemplary and are merely intended to provide further explanation of the subject matter.

BRIEF DESCRIPTION OF THE DRAWINGS

Various objects and advantages and a more complete understanding of embodiments of the present invention are apparent and more readily appreciated by reference to the following Detailed Description and to the appended claims when taken in conjunction with the accompanying Drawings wherein:

FIG. 2A provides an end view of a direct drive brushless motor equipped with a linear encoder.

FIG. 2B provides a side view of the direct drive brushless motor of FIG. 2A.

FIG. 2C provides a sectional view of the direct drive brushless motor of FIG. 2A.

FIG. 15 illustrates a perspective and partially transparent view of a high-torque, low-current brushless motor incorporating a multi-layer, variable pitch flexible printed coil in accordance with the disclosure.

FIGS. 21A-21E are various views of an alternate embodiment of a brushless electric motor including a dual magnetic rotor.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Reference will now be made in detail to embodiments of multi-layer, variable-pitch printed coil arrangements that may be used in, for example, electromagnetic actuators and brushless motors. A description of multi-layer, variable-pitch printed coil arrangements applicable to a variety of actuator designs and brushless motors is followed by a description of particular brushless motor designs in which such multi-layer, variable-pitch printed coil arrangements may be incorporated.

The multi-layer, variable-pitch printed coil arrangements disclosed herein may be used in moving coil electromagnetic actuators and are of lower mass than conventional coil structures using bobbins. Such lower mass enables electromagnetic actuators to be realized with piston structures capable of relatively greater acceleration. Moreover, the precision with which the multilayer printed coils described herein may be manufactured enables actuator and brushless motor designs with reduced tolerances and correspondingly closer placement of such coils to actuator magnets, thus facilitating relatively greater force production. Finally, the multi-layer, variable-pitch printed coil arrangements disclosed herein may be manufactured substantially more cost effectively than existing actuator coils.

In one embodiment each layer of the disclosed multilayer coils is produced by printing or otherwise depositing carbon nanotubes in a coil pattern.

Although the disclosed multi-layer, variable-pitch printed coil arrangements could be used within a variety of actuator and brushless motor designs, FIGS. 1-6 illustrate a particular brushless motor design capable of accommodating such multi-layer, variable-pitch printed coil arrangements. FIGS. 7-14 illustrate particular embodiments of multi-layer, variable-pitch printed coil arrangements in accordance with the disclosure. FIGS. 15-21 illustrate a particular high-torque, low-current brushless motor configured to incorporate the multi-layer, variable-pitch printed coil arrangements disclosed herein.

Multi-Layer, Variable-Pitch Printed Coils for Use with Cylindrical Bobbins

Figure 7:
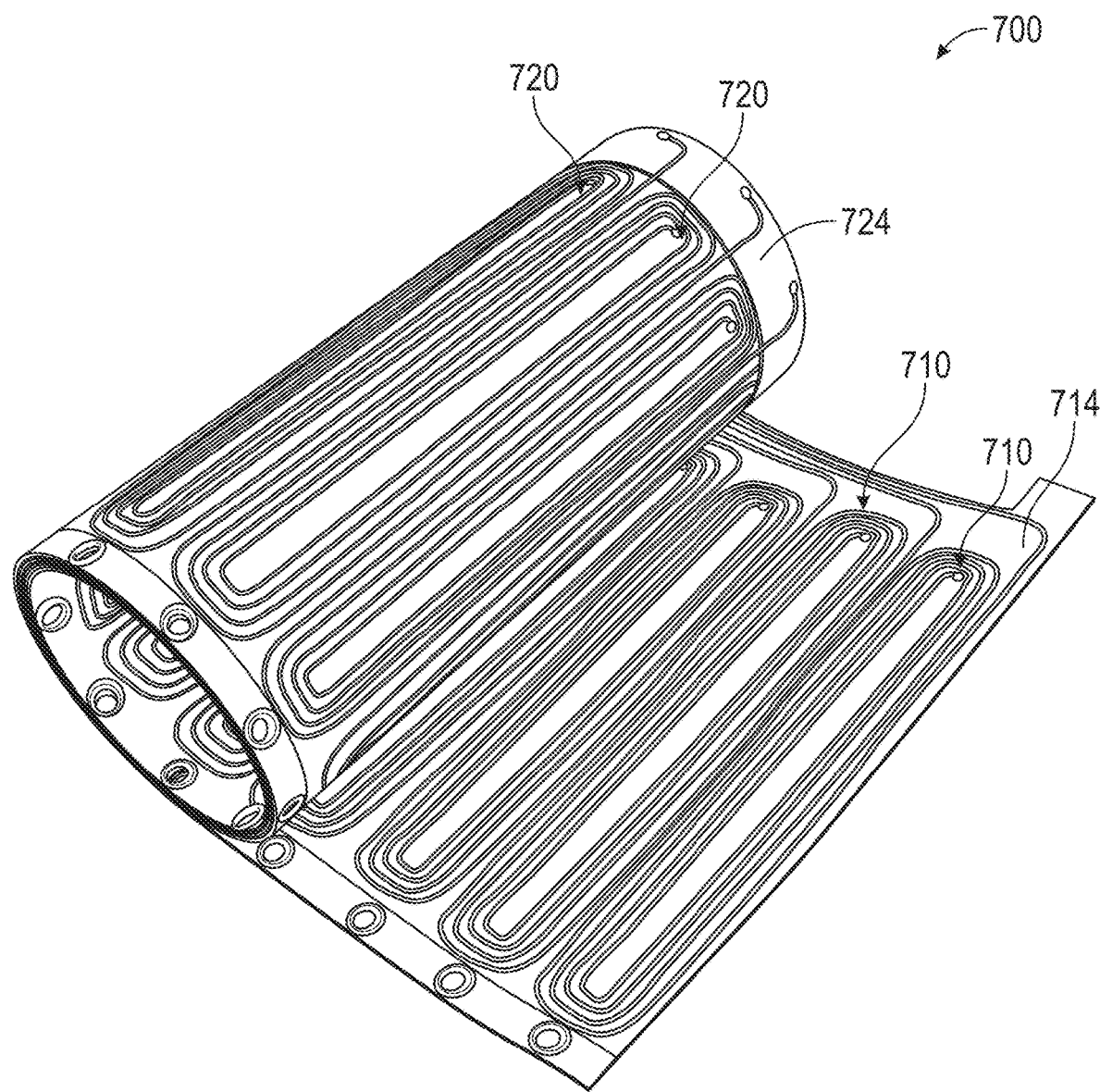
FIG. 7 is a perspective view of a multi-layer, variable pitch flexible printed coil circuit assembly configured to be wound around a cylindrical bobbin.

Attention is now directed to FIG. 7, which is a perspective view of multi-layer, variable pitch flexible printed coil circuit assembly 700 configured to be wound around a cylindrical bobbin (not shown). The printed coil circuit assembly 700 includes a first set of printed coils 710 on a first side 714 of the printed coil circuit assembly 700 and a second set of printed coils 720 on a second side 724 of the printed coil circuit assembly 700. Each of the first set of printed coils 710 is defined by a pattern of coil winding wires and each of the second set of printed coils 720 is defined by a pattern of coil winding wires. Once the printed coil circuit assembly 700 has been fabricated in the manner described below, it is wound around a bobbin in multiple layers (or "rollers") such that a plurality of printed coils 710 and 720 are included within each roller.

In one embodiment the spacing between the printed coils of a given roller, i.e., the coil pitch) is different than the coil pitch of the other rollers of the printed coil circuit assembly 700. One purpose of varying coil pitch among the rollers of the assembly 700 is to ensure that axial alignment is maintained between the coils in different rollers once the printed coil circuit assembly 700 has been would around a bobbin. Because the diameter of each subsequent wound layer (or "roller") of the printed coil circuit is larger than the preceding roller, the pitch between coils is increased within each successive roller so that corresponding coils within each roller remain in alignment along a linear axis intersecting the center of the bobbin.

Figure 8:
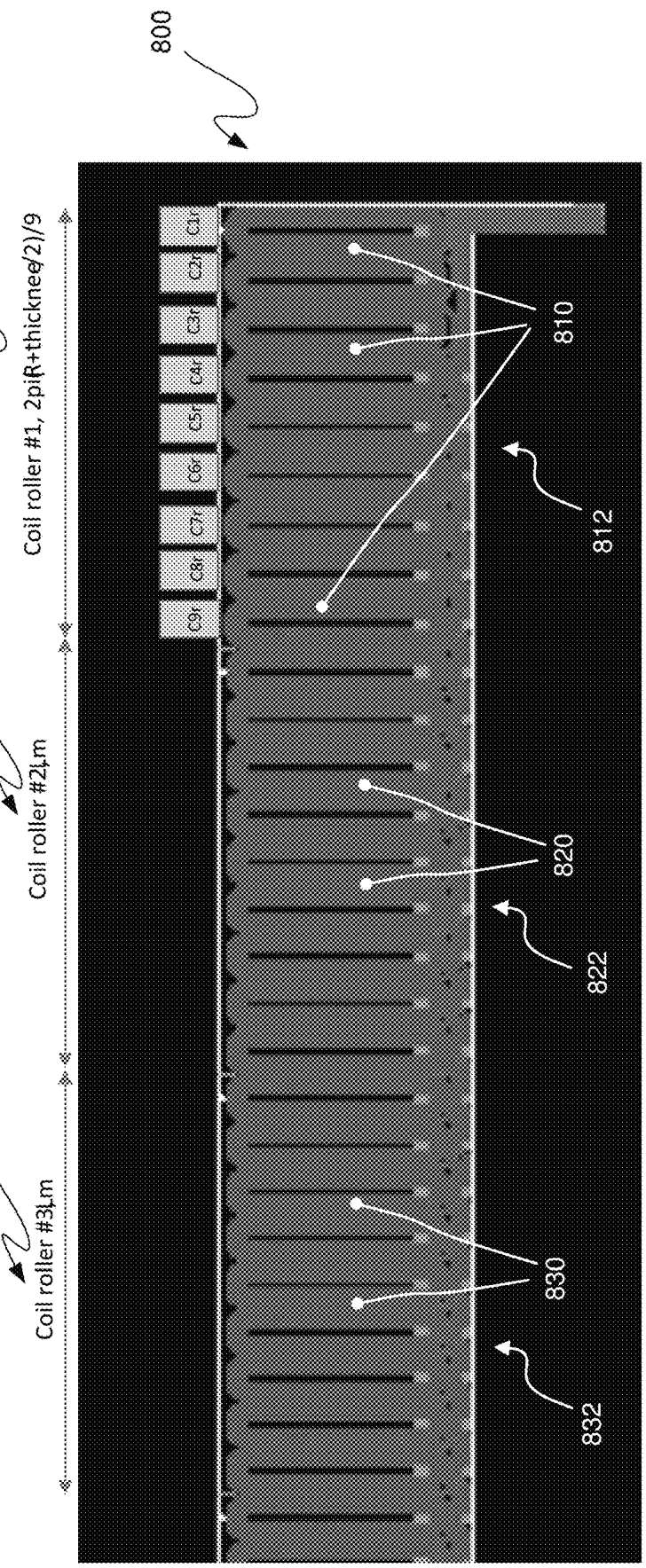
FIG. 8 shows a top view of a coil circuit assembly prior to winding of the assembly around a bobbin.
Figure 9:
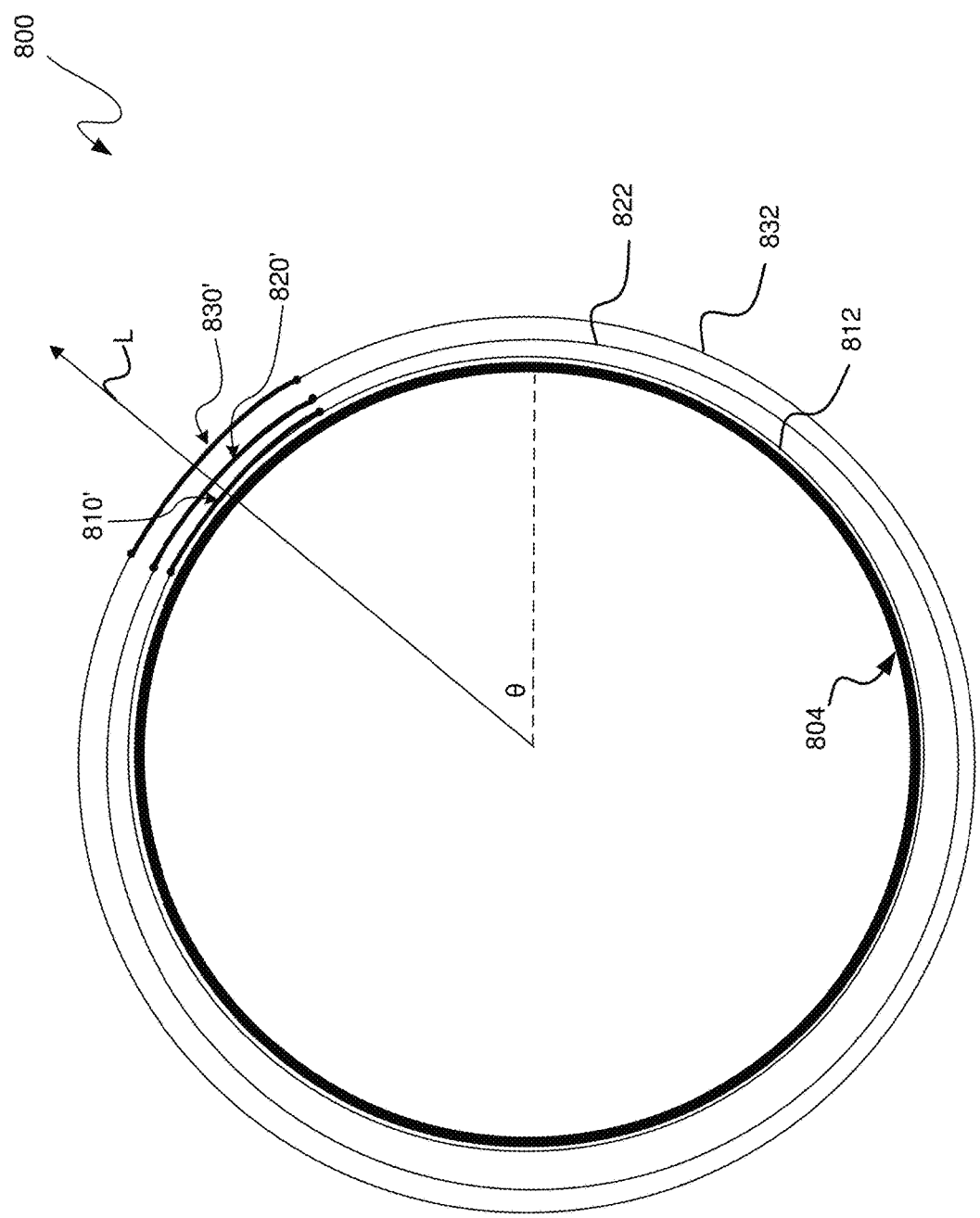
FIG. 9 shows a sectional view of the coil circuit assembly of FIG. 8 wound around a bobbin in multiple layers, i.e., rollers.

Turning now to FIGS. 8 and 9, there is shown a multi-layer, variable pitch flexible printed coil circuit assembly 800 configured to be wound around a cylindrical bobbin 804. FIG. 8 shows a top view of the coil circuit assembly 800 prior to winding of the assembly 800 around the bobbin 804. FIG. 9 shows a sectional view of the coil circuit assembly 800 wound around the bobbin 804 in multiple layers, i.e., rollers.

As shown in FIG. 8, the printed coil circuit assembly 800 includes a first coil roller 812, a second coil roller 822 and a third coil roller 832. In the embodiment of FIG. 8, the spacing between coils 810 of the first coil roller 812 may be less than the spacing between coils 820 of the second coil roller 822. Similarly, the spacing between coils 820 of the second coil roller 822 may be less than the spacing between coils 830 of the third coil roller 832, and so on. Thus, a length of the first coil roller 812 will be less than the length of the second coil roller 822, and the length of the second coil roller 822 will be less than the length of the third coil roller 832. It follows that the diameter of the first coil roller 812 when wound around bobbin 804 will be slightly less than the diameter of the second coil roller 822 when wound around the bobbin 804. Making the length of the first coil roller 812 slightly less that the length of the second coil roller 822 in this fashion ensures that corresponding coils 810 and 820 in the first and second coil rollers 812 and 822 are in essentially the same angular position relative to the bobbin 804.

In an embodiment in which each coil roller includes 9 coils, the radial length ($L_m$) of each coil roller is equal to 9×coil pitch, where the coil pitch in the $m^{th}$ roller is given by $2\pi(R+T_m/2)/9$, where R is the radius of the bobbin on which the printed coil is wound and $T_m$ is the thickness of the printed coil on the bobbin at the $m^{th}$ roller.

This axial alignment is illustrated by FIG. 9 (not to scale), which depicts corresponding coils 810', 820' and 830' centered at the same angular position θ (for purposes of clarity only one coil from each roller 812, 822, 832 is depicted). As shown in FIG. 9, an axial line L originating at the center of the cylindrical bobbin 804 and oriented at the angle θ bisects the corresponding coils 810', 820' and 830'.

Figure 10:
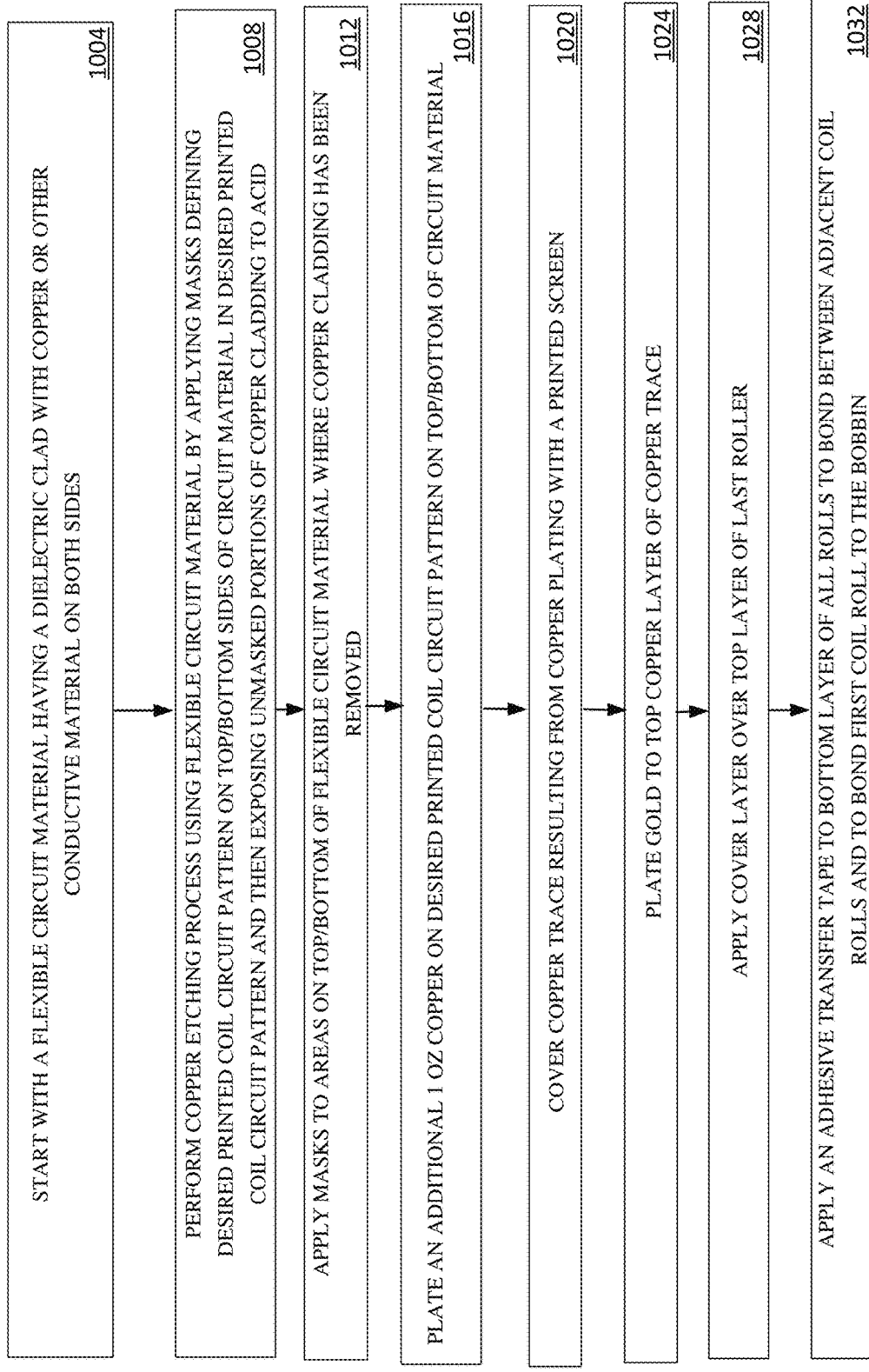
FIG. 10 is a flowchart of a process for fabricating a multi-layer, variable pitch flexible printed circuit in accordance with the disclosure.
Figure 11:
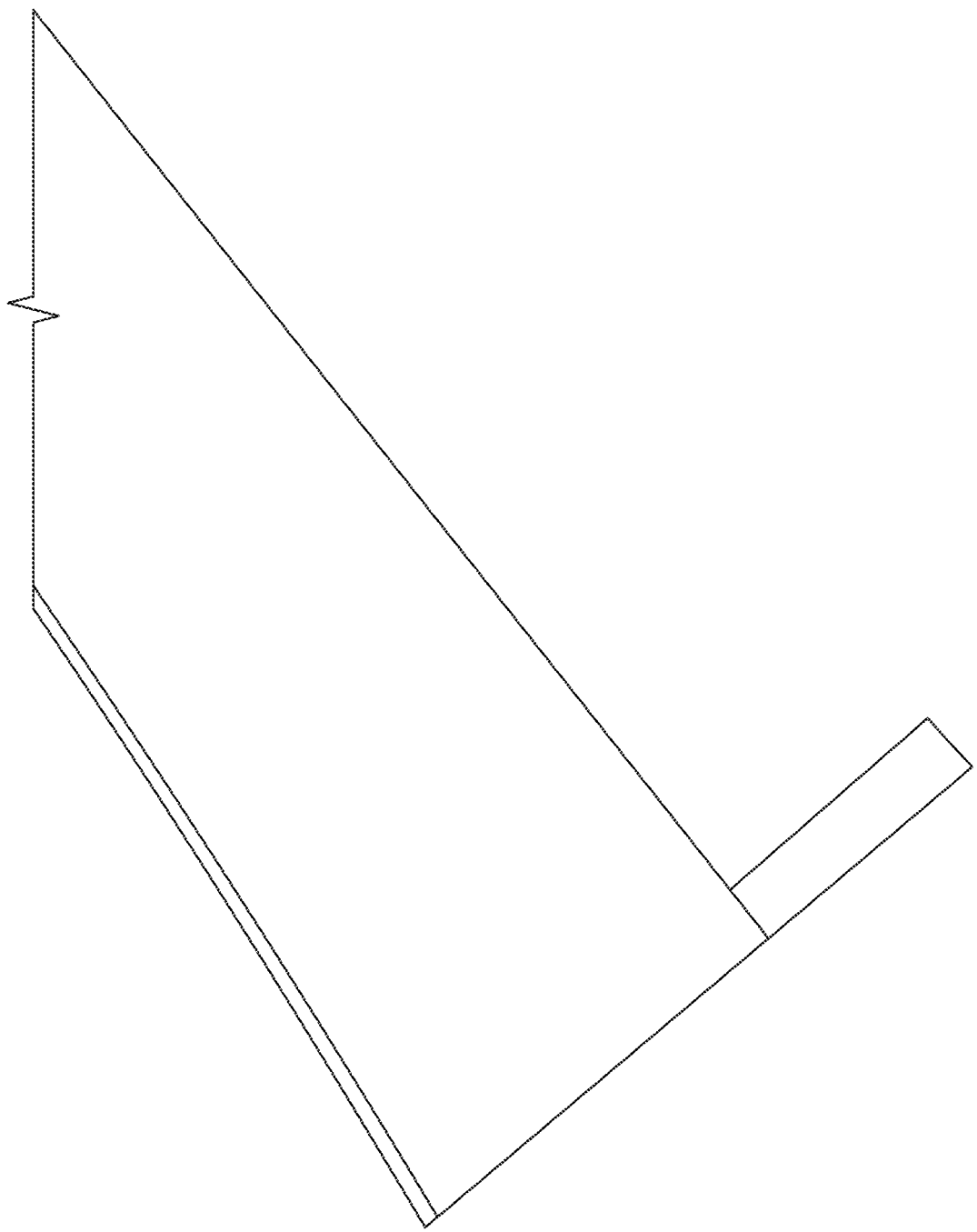
FIG. 11 illustrates an adhesive transfer tape applied to the bottom layer of all rollers in order to enable bonding of adjacent coil rollers to each other as they are wound around the bobbin and to enable bonding of the first coil roller to the bobbin.

Turning now to FIG. 10, a flowchart is provided of a process 1000 for fabricating a multi-layer, variable pitch flexible printed circuit in accordance with the disclosure. The process begins by selecting a flexible circuit material having a dielectric clad with copper on both sides (stage 1004). This material may, for example, comprise DuPont™ Pyralux® AP flexible circuit material, which is a double-sided, copper-clad laminate and an allpolyimide composite of polyimide film bonded to copper foil. In one embodiment AP9111R Pyralux® is utilized as the flexible circuit material so as to provide a 1 oz copper thickness (top/bottom) per one copper layer and 1 mil (0.025 mm) dielectric thickness. Of course, selection of the flexible circuit material depends upon the gauge of the copper wire required by the printed coil design. A copper etching process is then performed by applying, to each side of the flexible circuit material, a mask defining a desired printed coil circuit pattern comprised of multiple rollers having coils of variable pitch. The unmasked copper portions of the flexible circuit material are then exposed to acid and removed (stage 1008). In one embodiment this etching process defines a coil circuit track width of 0.897 mm (0.035 mm copper etch per layer) and a clearance between tracks of 5 mil (0.127 mm). Again, track width and thickness will be depend upon the copper gauge wire required for the printed coil circuit being fabricated. Additional masks are then applied to areas on the top/bottom of flexible circuit material where copper cladding has been removed (stage 1012). An additional 1 oz copper is then plated onto the desired printed coil circuit pattern on top/bottom of circuit material (stage 1016). In one embodiment this yields a clearance of 5 mil (final coil circuit has 2 oz copper thickness) between copper tracks. In other embodiments more copper may be used to produce tracks of larger gauge wire while less copper may be used to produce smaller gauge wire (smaller copper wire diameter). The copper trace resulting from the copper plating is then covered with a printed screen (stage 1020). Gold is then plated onto the top copper layer of the copper trace (stage 1024). A cover layer (e.g., LF0210) is then applied over the top layer of the last roller (i.e., the topmost layer of the printed coil circuit when wound around the bobbin) (stage 1028). One purpose of the cover layer is to protect the copper material which would otherwise be exposed to air and moisture, thereby preventing corrosion. As shown in FIG. 11, an adhesive transfer tape (e.g., 3M 9461) is then applied to the bottom layer of all rolls in order to enable bonding of adjacent coil rolls to each other as they are wound around the bobbin and to enable bonding of the first coil roll to the bobbin (stage 1032). This coil rolling and bonding process is described in greater detail with reference to FIG. 12.

Figure 12:
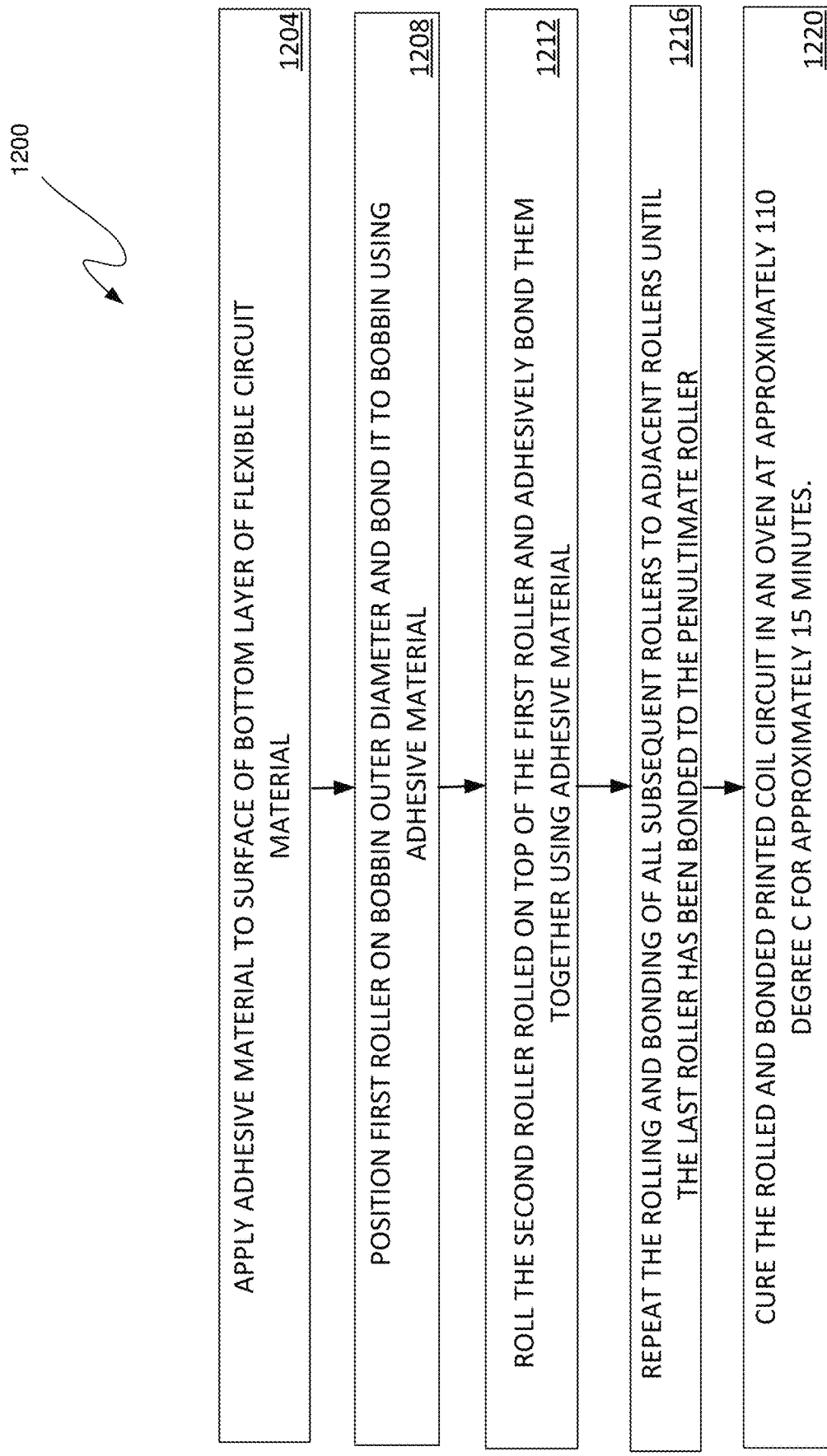
FIG. 12 is a flowchart illustrating a coil rolling and bonding procedure in accordance with the disclosure.

Attention is now directed to FIG. 12, which is a flowchart illustrating a coil rolling and bonding procedure 1200 in accordance with the disclosure. As shown, the procedure 1200 is initiated by applying adhesive material of an exemplary thickness of 1 mil. (e.g. 3M 9461) to the bottom layer surface of the flexible circuit material (stage 1204). The first roller of the etched and plated printed circuit material is then positioned on the outer diameter of the bobbin and then bound to it using the adhesive material (stage 1208). The second roller of the etched and plated printed circuit material is then rolled on top of the first roller and adhesively bonded to it using the adhesive material (stage 1212). Similar rolling and bonding of all subsequent rollers to adjacent rollers is then repeated until the last roller has been bonded to the penultimate roller (stage 1216). The resulting rolled and bonded printed coil circuit is then cured in an oven at approximately 110 degrees C. for approximately 15 minutes (stage 1220).

Figure 13:
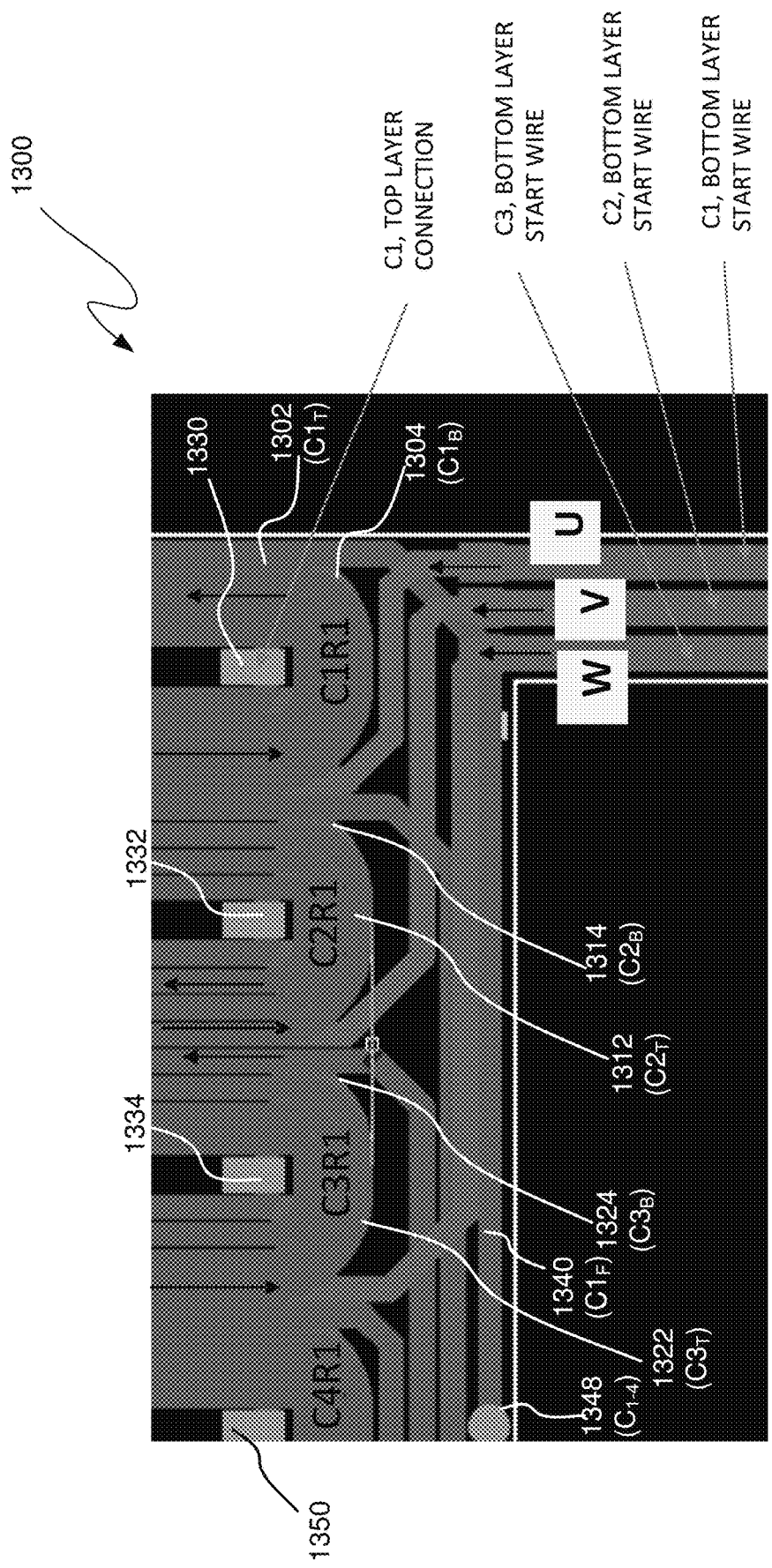
FIG. 13 illustrates an exemplary coil connection path for a multi-layer, variable pitch flexible printed coil circuit in accordance with the disclosure.

Attention is now directed to FIG. 13, which illustrates an exemplary coil connection path for a multi-layer, variable pitch flexible printed coil circuit 2400 in accordance with the disclosure. In one embodiment the printed coil circuit 1300 includes a plurality of coils C1R1-C9R1 of a first roller (R1) of the circuit 1300. Each coil C1R1-C9R1 is comprised of a top layer coil disposed in a top layer of the flexible printed coil circuit 1300 and a corresponding bottom layer coil disposed in a bottom layer on an opposite side of the circuit 1300. Specifically, the first coil C1R1 includes a first top layer coil ($C1_T$) 1302, the second coil C2R1 includes a second top layer coil ($C2_T$) 1312 and a third coil C3R1 includes a third top layer coil ($C3_T$) 1322. The coils ($C1_T$) 1302, ($C2_T$) 1312, ($C3_T$) 1322 are included within top layer of a first roller of the circuit 1300. Similarly, the first coil C1R1 includes a first bottom layer coil ($C1_B$) 1304, the second coil C2R2 includes a second bottom layer coil ($C2_B$) 1314 and the third coil C3R1 includes a third bottom layer coil ($C3_B$) 1324 included in the first roller.

As shown in FIG. 13, three coil terminals U, V and W correspond to start wires for the first bottom layer coil ($C1_B$) 1304, the second bottom layer coil ($C2_B$) 1314 and the third bottom layer coil ($C3_B$). In an embodiment the first bottom layer coil ($C1_B$) 1304 is serially connected to the first top layer coil ($C1_T$) 1302 through a first top layer connection 1330 extending through a via defined by the dielectric material between top and bottom layers of the printed coil circuit 1300. In like manner the second bottom layer coil ($C2_B$) 1314 is connected to the second top layer coil ($C2_T$) 1312 by a second top layer connector 1332 and both are energized by the start wire for coil terminal V. The third bottom layer coil ($C3_B$) 1324 is connected to the third top layer coil ($C3_T$) 1322 by a third top layer connector 1334 and both are energized by the start wire for coil terminal W.

It may be appreciated from the coil connection path illustrated in FIG. 13 that coil terminal U is connected to the start wire for the first bottom layer coil ($C1_B$) 1304 and that this start wire is connected, by way of the first top layer connection 1330, to a finish wire 1340 ($C1_F$) of the first top layer coil ($C1_T$) 1302 of the first coil C1R1. The fourth coil C4R1 of the first roller is wired substantially identically as the first coil C1R1 and is energized by the finish wire 1340 of the first top layer coil ($C1_T$) 1302 in the same way that the first coil C1R1 is energized by the start wire for coil terminal U. The same process is repeated for coil terminals "V" and "W". Again, a primary purpose of the coil connection arrangement of FIG. 13 is to serially connect coils of the printed coil circuit 2400 in the illustrated manner so that the coils in adjacent rollers, which are stacked and aligned by appropriately varying coil pitch in the manner described herein, may be energized so as to create constructively interfering fields.

Figure 14B:
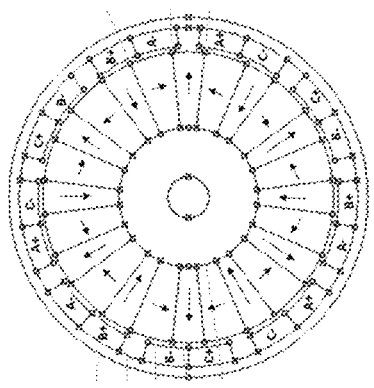
FIG. 14B illustrates an exemplary winding arrangement for a 6 pole pair implementation.
Figure 14A:
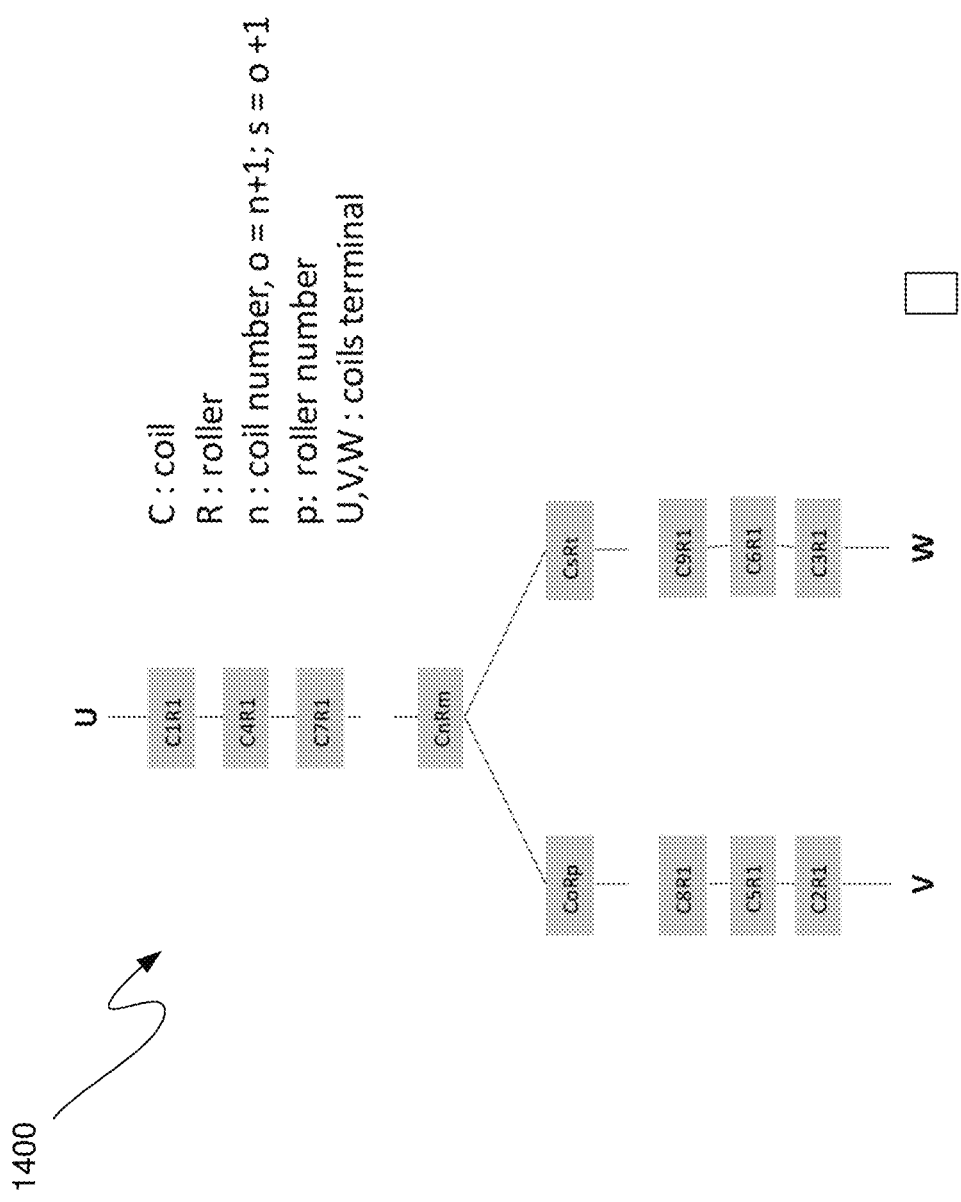
FIG. 14A is a coil circuit winding diagram illustrating an exemplary manner in which the coils of a flexible printed coil circuit may be serially connect.

Turning now to FIG. 14A, a coil circuit winding diagram 1400 illustrating an exemplary manner in which the coils of the flexible printed coil circuit 1300 may be serially connected is provided. As may be appreciated from FIG. 14, the flexible printed coil circuit may be configured as a 3-phase coil circuit in which the phases are controlled by the electrical signals applied to the terminals U, V, W. As indicated by the winding diagram 1400, the first coil C1R1 is serially connected to fourth coil C4R1 of the first roller, and the fourth coil C4R1 is in turn serially connected to a seventh coil C7R1 of the first roller In one embodiment a finish wire 1340 ($C1_F$) of the first top layer coil ($C1_T$) 1302 of the first coil C1R1 runs to a fourth bottom layer coil ($C4_B$) through an inter-coil connector 1348 ($C_{1-4}$). The fourth bottom layer coil ($C4_B$) is connected to a fourth top layer coil ($C4_T$) by a fourth top layer connector 1350. Thus, the serial connection established between the first coil C1 and the fourth coil C4R1 by the finish line of the of the first top layer coil ($C1_T$) 1302 effectively energizes both the fourth top layer coil ($C4_T$) and a fourth bottom layer coil ($C4_B$). In similar manner a finish line of the fourth top layer coil ($C4_T$) may be connected to a bottom layer of a seventh coil of the first roller. In this way a serial connection is established between the terminal U and the first (C1R1), fourth (C4R1) and seventh (C7R1) coils of the first roller of the flexible printed coil circuit 1300. In a substantially identical manner serial connections may be established between the terminal V and the second (C2R1), fifth (C5R1) and eighth (C8R1) coils of the first roller and between the terminal W and the third (C3R1), sixth (C6R1) and ninth (C9R1) coils of the first roller.

It may be further appreciated that the first three coils of a second roller of the printed coil circuit 1300, i.e., C1R2, C2R2 and C2R3, may be similarly serially connected to the coils C7R1, C8R1 and C9R1 of the first roller. Thus, the coils of the second and third rollers of the printed coil circuit 1300 may be energized by the terminals U, V and W by serially connecting the coils of the second and third rollers in substantially the same manner as the coils of the first roller are connected. Again, because the pitch between the coils within each roller is varied between rollers (i.e., the coil pitch increases in roller R2 relative to the coil pitch within roller R1, and increases in roller R3 relative to the coil pitch within roller R2), corresponding coils within each serially-connected roller are in axial alignment when wound around a bobbin. This advantageously enables their respective electromagnetic fields to constructively interfere.

FIG. 14B illustrates an exemplary winding arrangement for a 6 pole pair implementation.

It may be appreciated that in other embodiments the printed coils of each roller may be patterned on only a single side of a flexible circuit material rather than on both sides as described herein.

Brushless Motor Incorporating Multi-Layer, Variable-Pitch Printed Coils

Turning now to FIGS. 1-6, there are illustrated direct drive brushless motors adapted to include multi-layer, variable-pitch printed coil arrangements of the type described with reference to FIGS. 7-14. For purposes of clarity, various details of the multi-layer, variable-pitch printed coil printed coils illustrated discussed with reference to FIGS. 7-14 are omitted from the illustrations of the direct drive brushless motors describe below with reference to FIGS. 1-6.

Figure 1B:
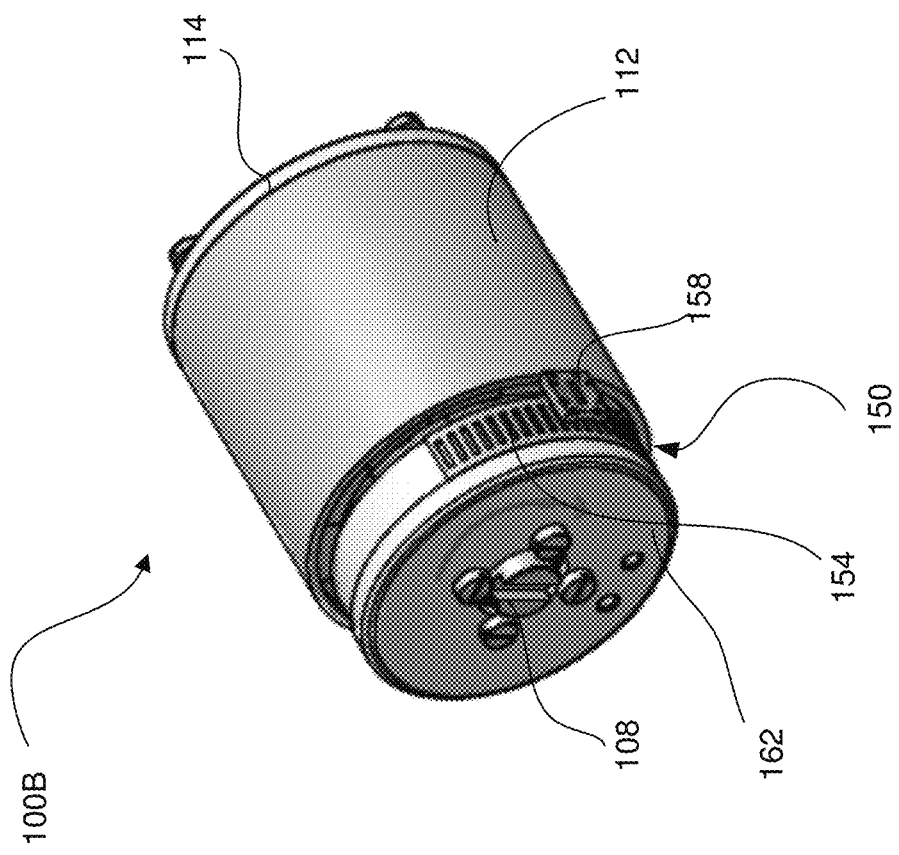
FIG. 1B illustrates a perspective view of a direct drive brushless motor equipped with a linear encoder for providing position feedback in accordance with the disclosure.
Figure 1A:
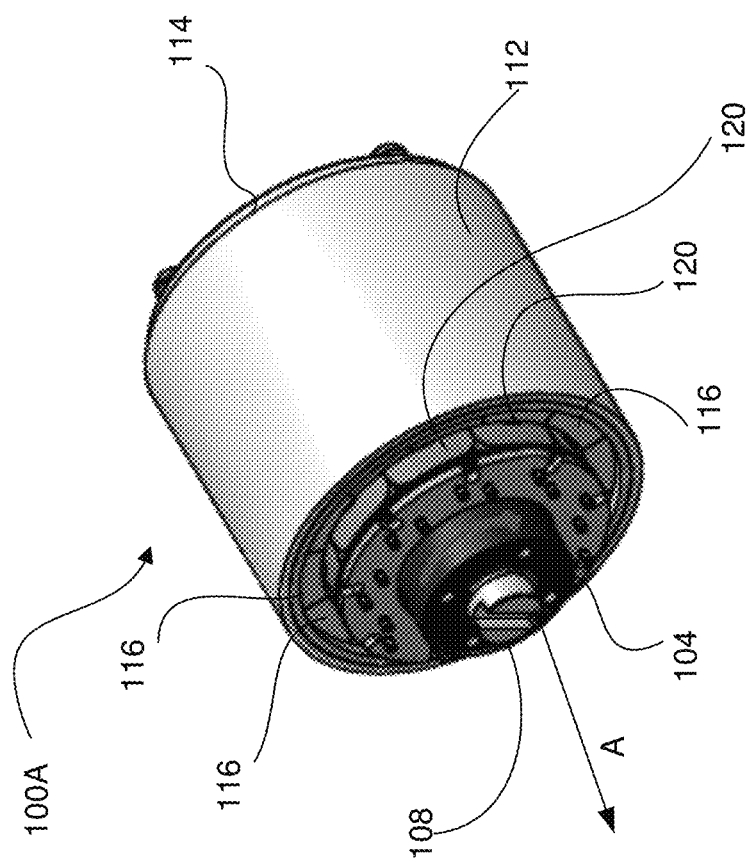
FIG. 1A illustrates a perspective view of a direct drive brushless motor adapted to include a multi-layer, variable-pitch printed coil arrangement in accordance with the disclosure.

Attention is now directed to FIG. 1A, which illustrates a perspective view of a direct drive brushless motor 100A adapted to include a multi-layer, variable-pitch printed coil arrangement in accordance with the disclosure. As shown in FIG. 1A, the direct drive brushless motor 100A can include a bobbin 104 and a center rotation shaft 108. The motor 100A further includes a motor housing 112 surrounding a plurality of outer magnets 116. During operation of the drive motor 100A, a dual magnetic circuit (described below) including a plurality of multi-layer, variable-pitch printed coils 120 causes a plurality of rotational components including the bobbin 104 and center rotation shaft 108 to rotate about a longitudinal axis A. The motor housing 112, plurality of outer magnets 116 and a back plate support 114 do not rotate during operation of the drive motor 100A.

FIG. 1B illustrates a perspective view of a direct drive brushless motor 100B equipped with a linear encoder for providing position feedback in accordance with the disclosure. In one embodiment the direct drive brushless motor 100B is substantially identical to the direct drive brushless motor 100A but further includes a linear encoder assembly 150 having a linear encoder feedback scale 154 and a linear feedback scale read head 158. The linear encoder feedback scale 154 is supported by a linear scale support 162. As is discussed further below, the read head 158 provides, to an external computing element or device (not shown), position feedback information concerning rotation of the plurality of rotational components of the direct drive brushless motor 100B.

FIGS. 2A, 2B and 2C respectively provide end, side and sectional views of the direct drive brushless motor 100B of FIG. 1B.

Figure 3:
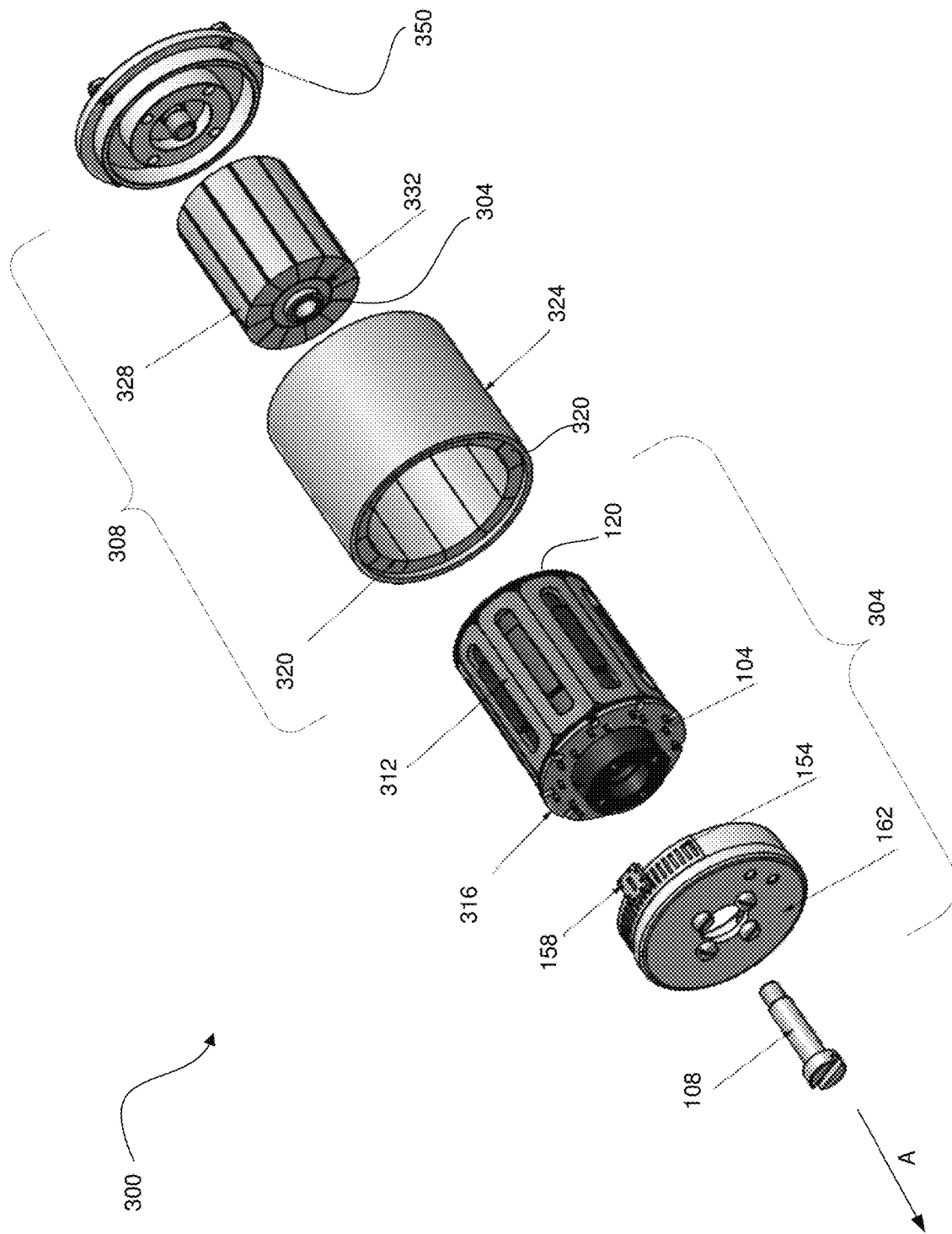
FIG. 3 provides a partially disassembled view of rotational components and non-rotational components of a direct drive brushless motor in accordance with the disclosure.

Attention is now directed to FIG. 3, which provides a partially disassembled view of a direct drive brushless motor 300 including a linear encoder assembly for providing position feedback information in accordance with the disclosure. In particular, the direct drive brushless motor 300 includes a plurality of rotational components 304 and a plurality of non-rotational components 308. In a particular implementation the plurality of rotational components 304 include a set of 9 multi-layer printed coils 312 arranged to form an annular structure. In other implementations a different number of multi-layer printed coils 312 may be used (e.g., 6, 12 or 18 coils). These multi-layer printed coils 312 may operate like brushless DC coils. Note that other quantities may also be used such as series 9 coils or parallel 3 coils. The coils 312 are attached to a termination plate 316.

As shown in FIG. 3, the plurality of non-rotational components include a plurality of inner magnets 328 and a steel core 332. A cylindrical sleeve 340 dimensioned to circumscribe the center rotation shaft 108 is surrounded by the steel core 332. In one embodiment the plurality of non-rotational components 308 includes a back plate 350 configured with a plurality of circular channels for appropriately guiding and centering the remainder of the non-rotational components 308. As shown, circular channel 370 of the back plate 350 receives the annular structure formed by coils 312.

During operation of the direct drive brushless motor 300, current is introduced through the multi-layer printed coils 312 thereby creating a magnetic field having a direction that depends on the direction that the current is flowing through the coils 312. The magnitude of the magnetic field corresponds to the number of turns associated with each coil and the amperage conducted through the conductive material. It should be understood that any type of conductive material with varying specifications can be used. It should further be understood that the multi-layer printed coils 312 may be electrically connected to a power source and/or connected together in any manner known in the electrical and mechanical arts such as by using, for example, a flexible cable ("flex cable").

The outer magnets 116 can be, for example, substantially rectangular with a curved cross section as shown in FIG. 3, and can be coupled to an interior wall of the motor housing 112. For example, the outer magnets 116 can be coupled to the motor housing 112 during manufacturing with various adhesives and/or screws. The outer magnets 116 can be adapted to magnetically interface with the rotational components 304 when a magnetic field is present in the coils 312. Hence, by repeatedly alternating the direction that current is flowing through the coils 312, a rotational force may be repeatedly imparted upon the rotational components 304, thus making the components 304 rotate about the longitudinal axis A.

As noted above, the linear encoder assembly 150 includes a linear encoder feedback scale 154 and a linear feedback scale read head 158. The linear encoder feedback scale 154 is supported by a linear scale support 162. The linear encoder assembly 150 can also include feedback circuitry (not shown) along with the linear encoder feedback scale 154 for indicating linear positional feedback to, for example, a controller (such as a remote computer). The linear feedback scale read head 158 (e.g., a sensor, a transducer etc.), can be paired with the linear encoder feedback scale 154 that can encode position. The linear feedback scale read head 158 can read the linear encoder feedback scale 154 and convert the encoded position into an analog or digital signal. This in turn can then be decoded into position data by a digital readout (DRO) or motion controller (not shown in FIGS. 1-3). The linear encoder assembly 150 can work in either incremental or absolute modes. Motion can be determined, for example, by change in position over time. Linear encoder technologies can include, for example, optical, magnetic, inductive, capacitive and eddy current. Optical linear encoders are common in the high resolution market (e.g., the semiconductor industry market and/or the biotechnology industry market) and can employ shuttering/Moiré, diffraction or holographic principles. Typical incremental scale periods can vary from hundreds of micrometers down to sub-micrometer, and following interpolation can provide resolutions as fine as 1 nm. The linear encoder assembly 150 can have a resolution in the range of, for example, 5 microns to 50 nm. In other embodiments, finer resolution encoders can also be incorporated providing resolutions up to, for example, 1 nm.

The linear encoder feedback scale 154 may include a series of stripes or markings running along a length of the linear encoder feedback scale 154. During operation of the direct drive brushless motor 100B/300, the linear feedback scale read head 158 (e.g., an optical reader) can count the number of stripes or markings read in order to determine the current position of the rotational components 304 relative to the non-rotational components 308. In some instances, the recorded positional data can be transmitted to a remote device for monitoring purposes. In some instances, a user can input one or more values to a remote device (such as a connected computer) in order to designate an amount of rotation desired for a particular task. These values can then be transmitted to a controller (not shown in FIGS. 1-3) in electrical communication with the linear encoder assembly 150 such that relative rotation of the plurality of rotational components 304 can be adjusted according to the values specified. The direct drive brushless motor 100/300 may include any number of electrical connections and may include any number of electronic control sequences. Furthermore, in other embodiments, the direct drive brushless motor 100/300 may include any number of on-board digital control and/or analog circuitry known in the electrical arts.

Again referring to FIG. 3, embodiments of the direct drive brushless motor may utilize a dual magnetic circuit in order to obtain higher torque. Specifically, the outer magnets 320, steel housing 324 of the motor, and coils 312 form a first circuit 380. The coils 312, inner magnets 328 and center rotation shaft 108 form a second circuit 384. This arrangement is believed to provide substantially more torque than is capable of being provided by standard brushless motors employing only a single "outer" circuit.

As is discussed below with reference to FIG. 5, embodiments of the direct drive brushless motor may include various rotation-limiting elements disposed to limit rotation of the rotating components 304 to a desired extent (e.g., +/−90 degrees) about the axis of rotation A (FIG. 1A).

Figure 4A:
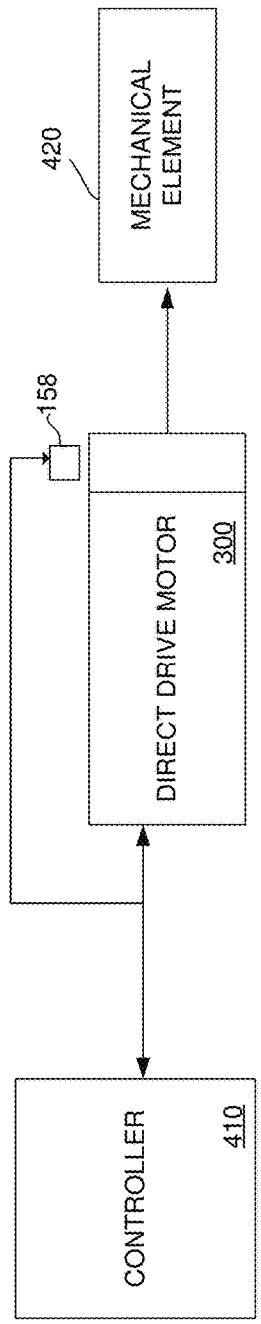
FIG. 4A is a block diagram of an exemplary arrangement of a direct drive brushless motor and an associated controller.

FIG. 4A shows a block diagram of an exemplary arrangement 400 of the direct drive brushless motor 300 and an associated controller 410. During operation of the motor 300, the read head 158 of the linear encoder provides a feedback signal containing information related to the position or angular orientation of the bobbin 104 and/or center rotation shaft 108. Controller 410 processes the feedback signal and provides a control signal to the motor 300 to adjust the rotation of the bobbin 104 and/or center rotation shaft 108 so as to appropriately move a mechanical element 420.

In one embodiment, the motor 300 sends measurements from its linear encoder to the controller 410 to indicate the precise rotational position about the axis A. In some configurations, the controller 410 can be, for example, a Galil DMC31012 controller with built-in amplifier and a 16 bit analog output.

As is known, the controller 410, such as a servo controller, can generate control signals that operate the motor 300. For example, in accordance with programmed instructions, typically in the form of software, the controller 410 can generate control signals and output such control signals to the motor 300 to cause movement of a mechanical member or element. In one embodiment the controller 410 is programmed to control the motor 300 depending on the particular application for which the finger 300 is being utilized. Typically, a computer (not shown) is coupled to the controller 410 to generate and transmit software (code representing a set of instructions to be executed) generated in a programming language to the controller 410 for the specific application. Such software, once running on the controller 410, will instruct the motor 300 to move the mechanical element 420 in a manner specific to the particular application or task.

Figure 4B:
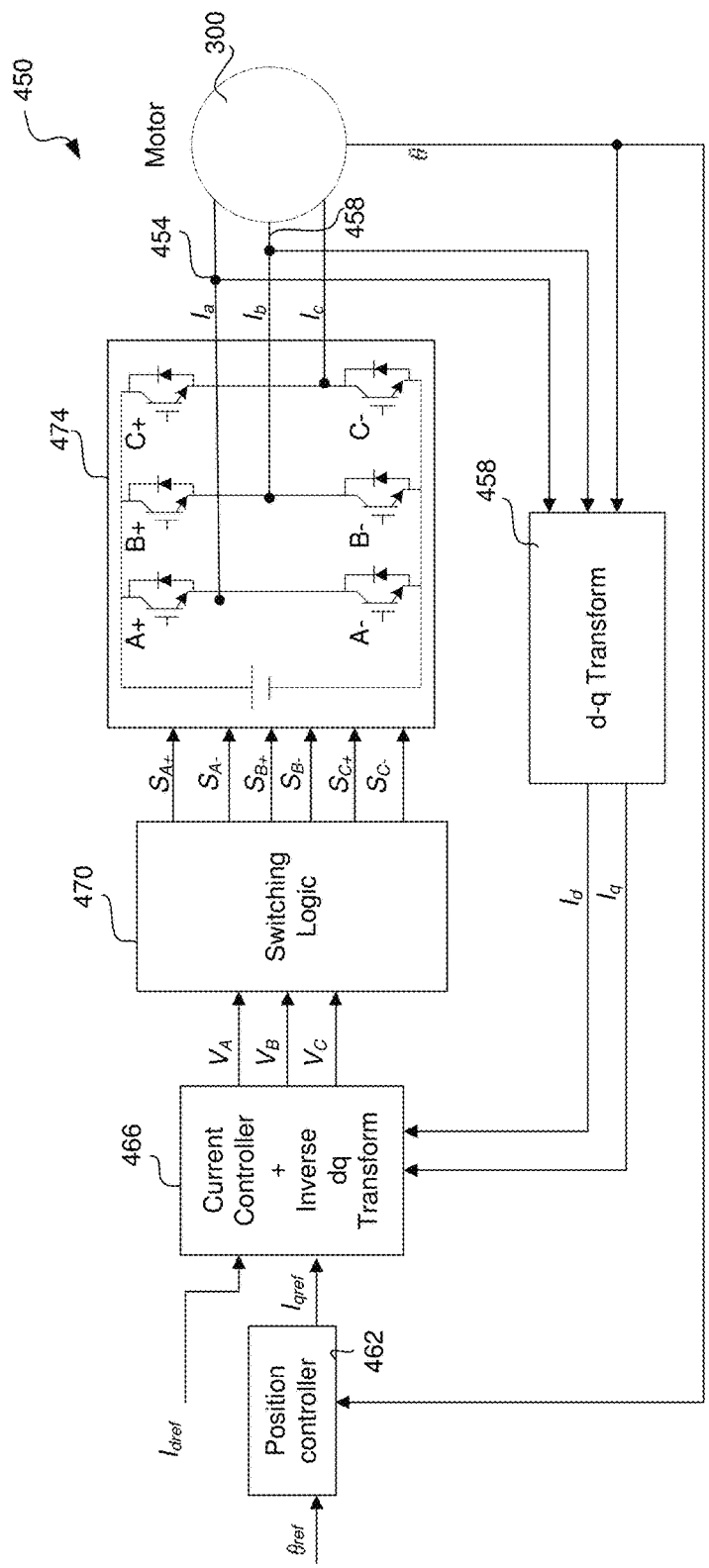
FIG. 4B is a functional block diagram is provided of a motor control apparatus.

Turning to FIG. 4B, a functional block diagram is provided of a motor control apparatus 450 which may be incorporated within the controller 410 or, alternatively, within the direct drive motor 300. In the embodiment of FIG. 4B the motor control apparatus 450 operates to drive the coils 312 of the motor 300 through sinusoidal commutation using a direct-quadrature (d-q) control process. That is, each coil phase is energized by a continuous sinusoidal current to produce motion at a constant torque.

During operation the motor control apparatus 450 functions to control currents flowing through the coils 312. To this end a first current sensor 454 detects a first current $I_a$ flowing through one of the coils 312 and a second current sensor 458 detects a second current $I_b$ flowing through another of the coils 312. As shown, measurements of the currents $I_a$, $I_b$ and an actual position signal (θ) from the encoder read head 158 (or other position sensor operative to detect the angular position of a rotating component of the motor 300) are supplied to a d-q transform module 458 configured to implement a d-q transform (also known as a Park transform). As is known, the d-q transform may be used to effectively transform or otherwise project a three-phase system onto a two-dimensional control space. Although in the general case implementation of the d-q transform requires $I_c$ in addition to $I_a$, $I_b$ and θ, in the present embodiment the 3-phase coils of the motor 300 are balanced and thus $I_c$ can be reconstructed from $I_a$ and $I_b$.

Implementation of the Park transform enables the module 458 to express the set of three sinusoidal currents present on the coils 312 as a direct axis current $I_d$ and a quadrature axis current $I_q$. Since the Park-transformed currents $I_d$, $I_q$ are essentially constant, it becomes possible to control the motor 300 by using the constant currents $I_d$, $I_q$ rather than the sinusoidal signals actually supplied to the motor 300.

As shown in FIG. 4B, the control apparatus 450 includes a position control module 462 that receives a signal indicative of a reference angle (Orel) as well as the actual position signal θ from the encoder read head 158. Based upon these values the position control module 462 provides a quadrature axis reference current $I_{q,ref}$ to a current controller and inverse d-q transform module 466. The current controller within the module 466 determines differences between the Park-transformed currents $I_d$, $I_q$ and the reference currents $I_{q,ref}$, $I_{d,ref}$ and performs an inverse d-q transform based upon the results. These operations yield command values $V_A$, $V_B$ and $V_C$ which are then mapped into inverter switching signals $S_{A+}$, $S_{A-}$, $S_{B+}$, $S_{B-}$, $S_{C+}$, $S_{C-}$, by switching logic 470. A 3-phase voltage source inverter 474 under the control of these switching signals then generates the currents $I_a$, $I_b$, $I_c$ delivered to the coils 312.

Figure 5A:
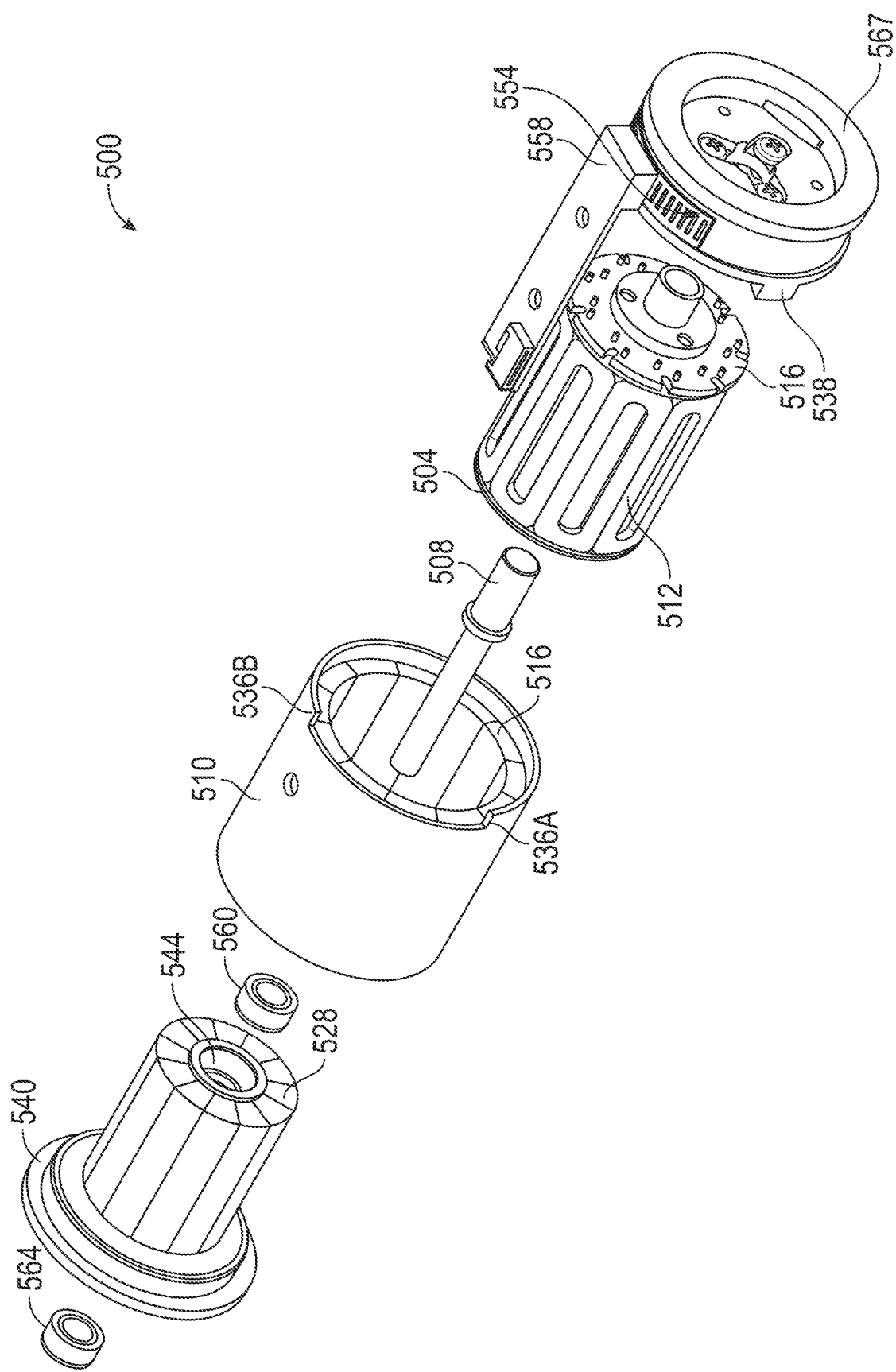
FIG. 5A provides a partially disassembled view a direct drive brushless motor which includes rotation-limiting elements configured to limit rotation of rotating components of the motor to within a desired range.
Figure 5B:
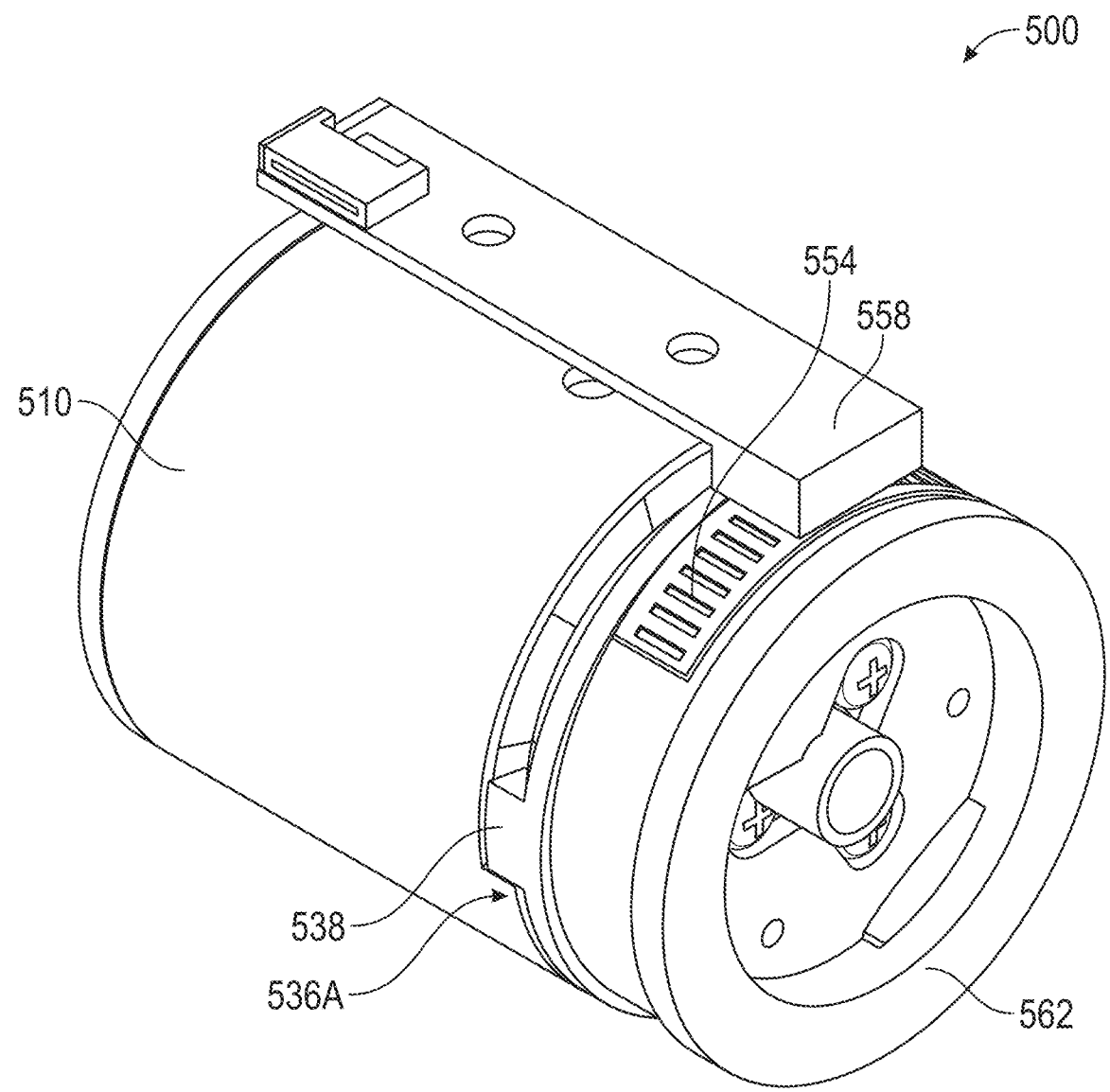
FIG. 5B provides an assembled view of the direct drive brushless motor of FIG. 5A.

Attention is now directed to FIG. 5A, which provides a partially disassembled view of a direct drive brushless motor 500 including rotation-limiting elements configured to limit rotation of rotating components of the motor 500 to within a desired range (e.g., 90 degrees). FIG. 5B provides an assembled view of the direct drive brushless motor 500. As shown in FIG. 5A, the direct drive brushless motor 500 includes a set of 9 rotating multi-layer printed coils 512 arranged to form an annular structure. In other implementations a different number of coils 512 may be used (e.g., 6, 12 or 18 coils). These coils 512 may operate like brushless DC coils. Note that other quantities may also be used such as series 9 coils or parallel 3 coils. The coils may be wired Y and series. The multi-layer printed coils 512 are attached to a termination plate 516

As shown in FIG. 5A, the direct drive brushless motor 500 can include a bobbin 504 and a center rotation shaft 508. The motor 500 further includes a motor housing 510 surrounding a plurality of outer magnets 516. During operation of the drive motor 500, a dual magnetic circuit (described below) including the plurality of multi-layer printed coils 512 causes the rotational components of the motor 500, which include the bobbin 504 and center rotation shaft 508, to rotate about a longitudinal axis of the motor aligned with the shaft 508. Rotation of these components may be constrained within a desired range by rotation limiting surfaces 536 of the motor housing 510 in cooperation with a rotation stopper element 538. The motor housing 510, plurality of outer magnets 516 and a back plate 540 do not rotate during operation of the motor 500.

The direct drive brushless motor 500 may further include a plurality of non-rotational inner magnets 528. The back plate 540 supports a center pole structure 544 circumscribed by the non-rotational inner magnets 528. The motor 500 further includes a front ball bearing 560 and rear ball bearing 564. A linear encoder assembly includes a linear encoder feedback scale 554 and a linear feedback scale read head 558. The linear encoder feedback scale 554 is supported by a motor hub 562. The read head 558 provides, to an external computing element or device (not shown), position feedback information concerning rotation of the rotational components of the direct drive brushless motor 500.

Embodiments of the direct drive brushless motor 500 may utilize a dual magnetic circuit in order to obtain higher torque. Specifically, the outer magnets 516, center pole 544, and coils 512 form a first circuit. The multi-layer printed coils 512, inner magnets 528 and center rotation shaft 508 form a second circuit. This arrangement is believed to provide substantially more torque than is capable of being provided by standard brushless motors employing only a single "outer" circuit.

Figure 6:
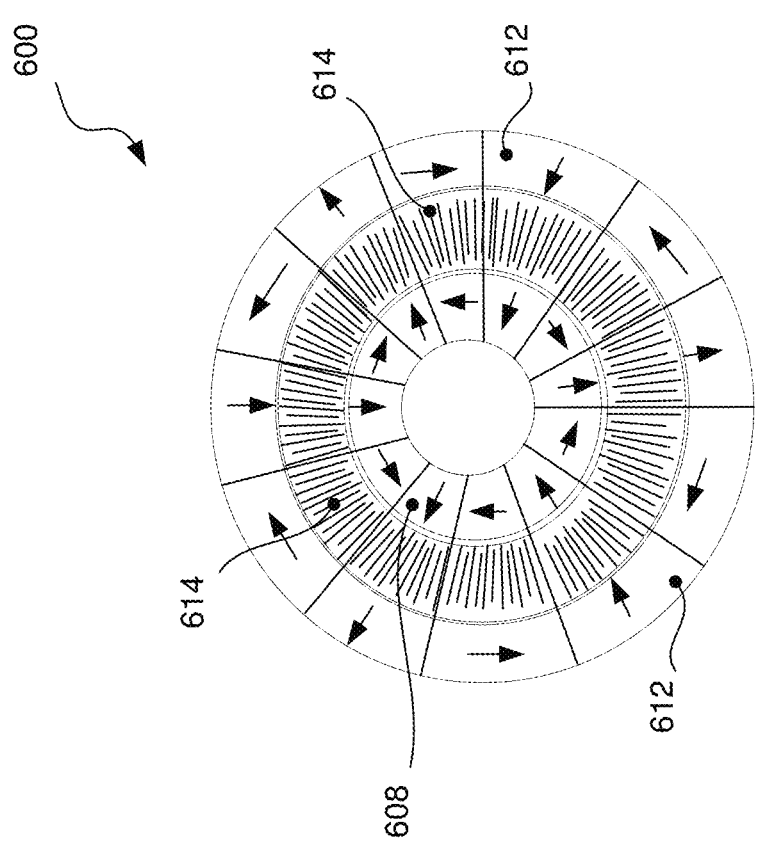
FIG. 6 provides a sectional view of components of a direct drive brushless motor incorporating a Halbach magnet arrangement.

Turning now to FIG. 6, a sectional view of components of a direct drive brushless motor 600 incorporating a Halbach magnet arrangement is provided. As shown, in the embodiment of FIG. 6, a plurality of inner magnets 608 are arranged so as to form an inner Halbach cylinder and a plurality of outer magnets 612 are arranged so as to form an outer Halbach cylinder. A plurality of multi-layer printed coils 614 are arranged in the shape of a cylinder and interposed between the plurality of inner magnets 608 and the plurality of outer magnets 612. The plurality of inner magnets 608 and the plurality of outer magnets 612 are included within dual magnetic circuits which cooperate to increase the flux density of the magnetic field between them. Specifically, the inner magnets 608 and outer magnets 612 increase the magnetic field in the volume in which the plurality of multi-layer printed coils 614 are disposed. This increased flux density results in a higher output torque for a given current level relative to conventional designs employing only a single "outer" magnetic circuit. The remaining components of the direct drive brushless motor 600 are substantially similar or identical to those described with reference to FIGS. 1-5 and have been omitted from FIG. 6 for purposes of clarity.

Embodiments of the direct drive brushless motor described with reference to FIGS. 1-6 may be used in connection with, for example, robotic fingers designed to emulate the range of motion of human fingers. In one embodiment, the design of the motor takes into account that the motor does not need to run through complete turns of 360 degrees in order to mimic the behavior of a human finger; rather, turns of 90 or 30 degrees may be sufficient. Accordingly, in one embodiment the motor comprises a partial moving-coil rotary motor. The partial rotary motor may be advantageously configured to have a light moving mass, thereby facilitating a fast response and low current draw.

High-Torque, Low-Current Brushless Motor Having Multi-Layer, Variable-Pitch Printed Coils FIGS. 15-21 illustrate a high-torque, low-current brushless motor adapted to include multi-layer, variable-pitch printed coil arrangements of the type described with reference to FIGS. 7-14. For purposes of clarity, various details of the multi-layer, variable-pitch printed coil coils illustrated discussed with reference to FIGS. 7-14 are omitted from the illustrations of the high-torque, low-current brushless motor described below with reference to FIGS. 15-21.

Turning now to FIG. 15, there is shown a perspective and partially transparent view of a high-torque, low-current brushless motor 1500 incorporating a multi-layer, variable pitch flexible printed coil arrangement in accordance with the disclosure. As shown in FIG. 15, the brushless motor 1500 can include an motor output shaft 1508 and a motor housing 1510 surrounding dual magnetic cylinders (not shown). The motor 1500 further includes a controller housing 1512, which is depicted partially transparently in FIG. 15. The controller housing 1512 surrounds a controller 1506 and includes an end plate 1507 through which protrudes a servo connector interface 1509. During operation of the motor 1500, the dual magnetic cylinders and the motor output shaft 1508 rotate about a longitudinal axis A. The motor housing 1510, controller housing 1512, end plate 1507 and a top plate 1515 do not rotate during operation of the motor.

Although controller 1506 is shown as being within a controller housing 1512 abutting the motor housing 1510, in other embodiments the controller for the electric motor may be in essentially any location. For example, the controller may be located remote from the motor (e.g., in a remote computer in network communication with the motor).

Figures 16A, 16B, 16C:
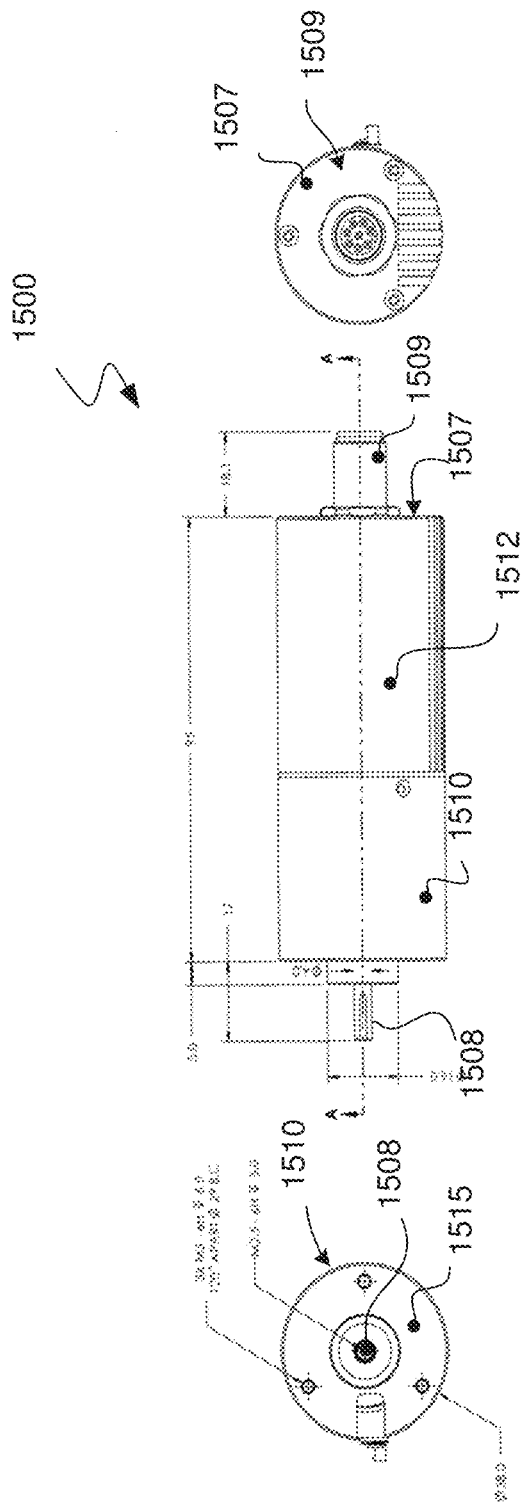
FIGS. 16A, 16B and 16C respectively provide top end, side and rear end views of the motor of FIG. 15.

FIGS. 16A, 16B and 16C respectively provide top end, side and rear end views of the motor 1500 of FIG. 15.

Figure 17:
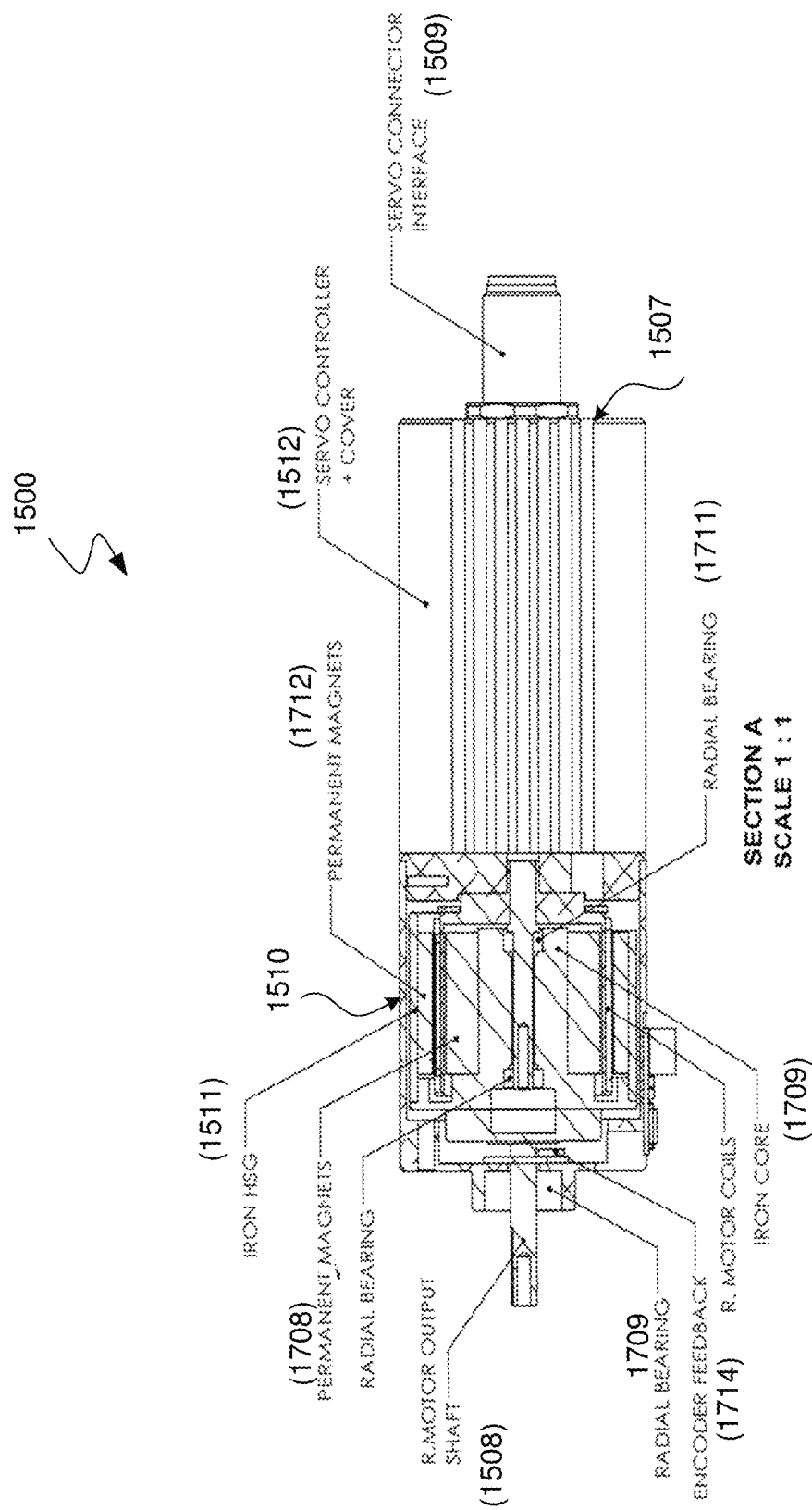
FIG. 17 provides a side sectional view of a top portion of the motor of FIG. 15.

Attention is now directed to FIG. 17, which provides a side sectional view of a top portion of the motor 1500 including the motor housing 1510. The remainder of the motor 1500, including the controller housing 1512, is not shown in section in FIG. 17. In one embodiment the motor 1500 includes a plurality of rotational components including the motor output shaft 1508, a plurality of inner magnets 1708 arranged in the shape of a cylinder circumscribing the longitudinal axis A, and a plurality of outer magnets 1712 also cylindrically arranged to circumscribe the longitudinal axis A. The plurality of inner magnets 1708 are coupled to an iron core member 1709. First and second radial bearings 1709, 1711 circumscribe the output shaft 1508. An encoder feedback read head 1720 is positioned to read an encoder feedback scale positioned on, for example, the output shaft 1508 or on a rotating surface coupled to the output shaft.

The motor 1500 further includes a plurality of non-rotational components including a set of 12 multi-layer, variable pitch coils 1714 arranged to form a cylindrical structure interposed between the plurality of inner magnets 1708 and the plurality of outer magnets 1712. In other implementations a different number of coils 1712 may be used (e.g., 6, 9 or 18 coils). The coils 1714 may operate like brushless DC coils. The coils 1712 may be attached to the motor housing 1510 or to a molded structure in turn coupled to the motor housing 1510.

Figure 18:
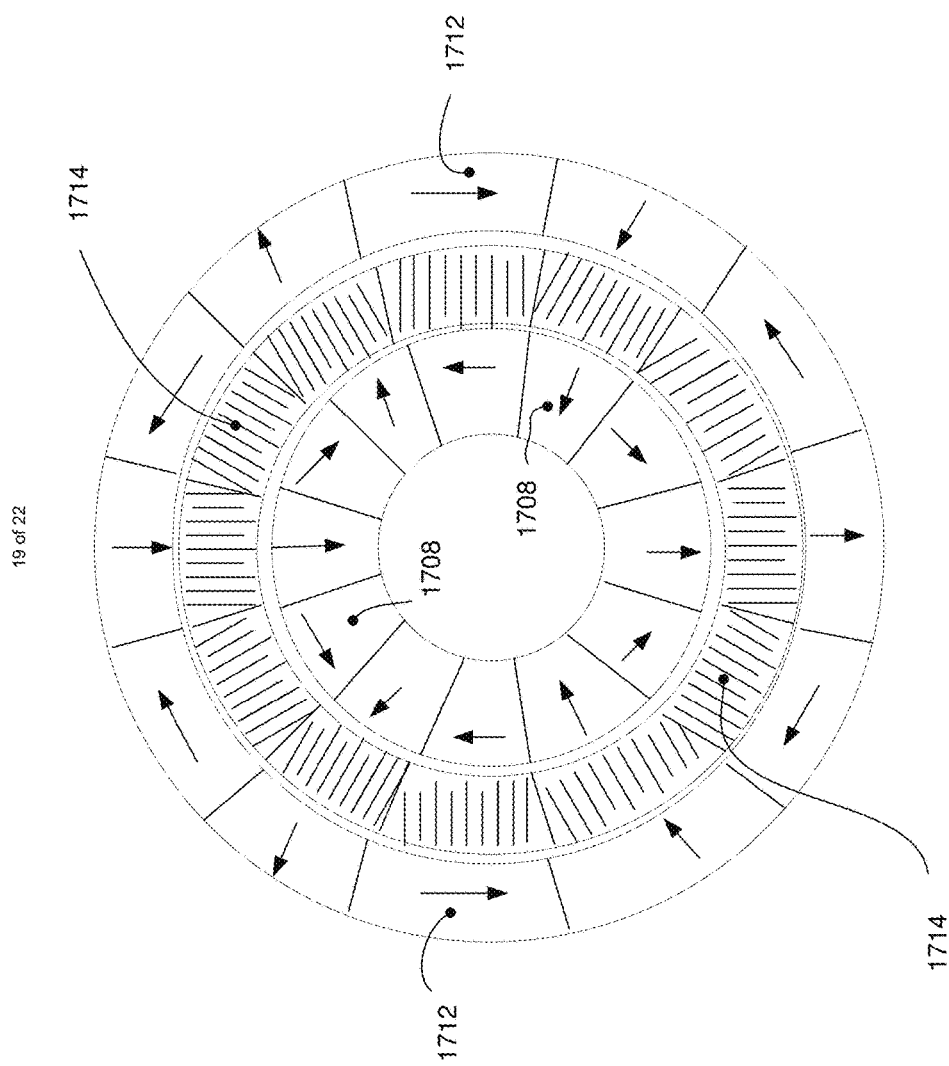
FIG. 18 is a sectional view of the motor of FIG. 15 transverse to a longitudinal axis A.

Turning now to FIG. 18, a sectional view of the motor 1500 is provided transverse to the longitudinal axis A. As shown, in the embodiment of FIG. 17, the plurality of inner magnets 1708 are arranged so as to form an inner Halbach cylinder and the plurality of outer magnets 1712 are arranged so as to form an outer Halbach cylinder. The plurality of multi-layer, variable pitch coils 1714 are arranged in the shape of a cylinder and interposed between the plurality of inner magnets 1708 and the plurality of outer magnets 1712. The plurality of inner magnets 1708 and the plurality of outer magnets 1712 are included within dual magnetic circuits which cooperate to increase the flux density of the magnetic field between them. Specifically, the inner magnets 1708 and outer magnets 1712 increase the magnetic field in the volume in which the plurality of coils 1712 are disposed. This increased flux density results in a higher output torque for a given current level relative to conventional designs employing only a single "outer" magnetic circuit.

During operation of the brushless motor 1500, current is introduced through the coils 1714 thereby creating a magnetic field having a direction that depends on the direction that the current is flowing through the coils 1714. The magnetic fields produced by the coils 1714 interact with the magnetic fields generated by the inner magnets and the outer magnets 1712 in order to produce a rotational force that acts on the rotational components of the motor 1500. The magnitude of the magnetic field produced by the coils 1714 corresponds to the number of turns associated with each coil 1714 and the amperage conducted through the conductive material. It should be understood that any type of conductive material can be used. It should further be understood that the coils 1712 may be electrically connected to a power source and/or connected together in any manner known in the electrical and mechanical arts such as, for example, by using a flex cable.

The outer magnets 1712 can be, for example, substantially rectangular with a curved cross section as shown in FIG. 18, and can be coupled to a cylindrical support structure 1511 surrounded by an interior wall of the motor housing 1510. For example, the outer magnets 1516 can be coupled to the support structure 1511 during manufacturing with various adhesives and/or screws.

As noted above, the encoder assembly includes an encoder feedback scale mounted so as to rotate with the output shaft 1508 and an encoder feedback read head 1720. The encoder assembly can also include feedback circuitry (not shown) along with the encoder feedback scale for indicating positional feedback to, for example, the controller 1506 or a controller not disposed within (such as a remote computer). The encoder feedback read head 1720 (e.g., a sensor, a transducer etc.), can be paired with the encoder feedback scale that can encode position. The encoder feedback read head 1720 can read the encoder feedback scale and convert the encoded position into an analog or digital signal. This in turn can then be decoded into position data by a digital readout (DRO) or motion controller (not shown). The encoder assembly can work in either incremental or absolute modes. Motion can be determined, for example, by change in position over time. Encoder technologies can include, for example, optical, magnetic, inductive, capacitive and eddy current.

The encoder feedback scale may include a series of stripes or markings running along a length of the linear encoder feedback scale printed on, or affixed to, the motor output shaft 1508 or a surface coupled thereto. During operation of the brushless motor, the encoder feedback read head 1720 (e.g., an optical reader) can count the number of stripes or markings read in order to determine the current position of the rotational components of the motor 1500 relative to the non-rotational components. In some instances, the recorded positional data can be transmitted to a remote device for monitoring purposes. In some instances, a user can input one or more values to a remote device (such as a connected computer) in order to designate an amount of rotation desired for a particular task. These values can then be transmitted to a controller in electrical communication with the encoder assembly such that relative rotation of the plurality of rotational components can be adjusted according to the values specified. The brushless motor 1500 may include any number of electrical connections and may include any number of electronic control sequences. Furthermore, in other embodiments, the motor 1500 may include any number of on-board digital control and/or analog circuitry known in the electrical arts.

As is known, the controller 1506, such as a servo controller, can generate control signals that operate the motor 1500. For example, in accordance with programmed instructions, typically in the form of software, the controller 1506 can generate control signals and output such control signals to the motor 1500 to cause movement of the shaft 1508. In one embodiment the controller 1506 is programmed to control the motor 1500 depending on the particular application for which the motor 1500 is being utilized. Typically, a computer (not shown) is coupled to the controller 1506 to generate and transmit software (code representing a set of instructions to be executed) generated in a programming language to the controller 1506 for the specific application. Such software, once running on the controller 1506, will instruct the motor 1500 to move the shaft 1508 in a manner specific to the particular application or task.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Figure 19:
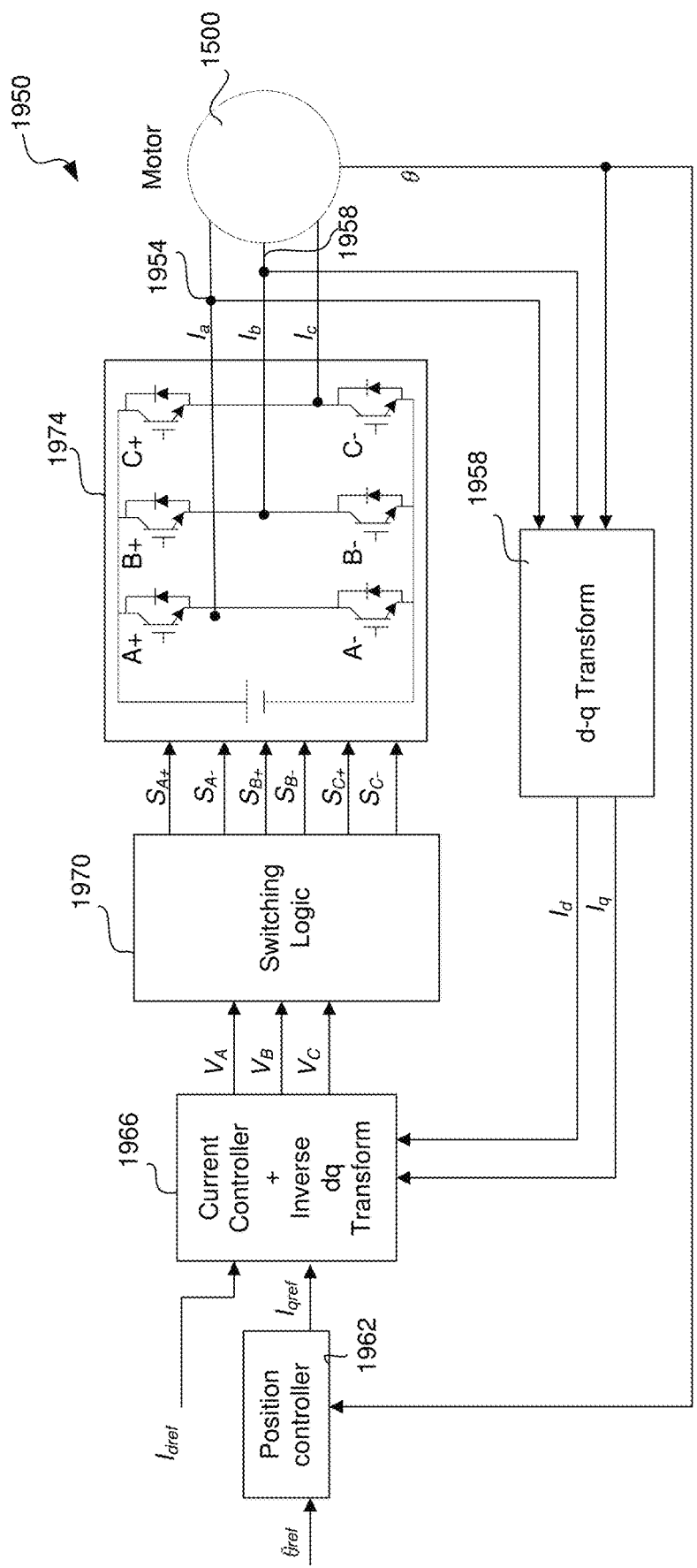
FIG. 19 is a functional block diagram of a motor control apparatus which may be incorporated within a controller of an embodiment of a high-torque, low-current brushless motor.

Turning to FIG. 19, a functional block diagram is provided of a motor control apparatus 1950 which may be incorporated within the controller 1506. In the embodiment of FIG. 19 the motor control apparatus 1950 operates to drive the coils 1714 of the motor 1500 through sinusoidal commutation using a direct-quadrature (d-q) control process. That is, each coil phase is energized by a continuous sinusoidal current to produce motion at a constant torque.

During operation the motor control apparatus 1950 functions to control currents flowing through the coils 1714. To this end a first current sensor 1954 detects a first current $I_a$ flowing through one of the coils 1714 and a second current sensor 1958 detects a second current $I_b$ flowing through another of the coils 1714. As shown, measurements of the currents $I_a$, $I_b$ and an actual position signal (θ) from the encoder read head 1558 (or other position sensor operative to detect the angular position of a rotating component of the motor 1500) are supplied to a d-q transform module 1958 configured to implement a d-q transform (also known as a Park transform). As is known, the d-q transform may be used to effectively transform or otherwise project a three-phase system onto a two-dimensional control space. Although in the general case implementation of the d-q transform requires $I_c$ in addition to $I_a$, $I_b$ and θ, in the present embodiment the 3-phase coils of the motor 1500 are balanced and thus $I_c$ can be reconstructed from $I_a$ and $I_b$.

Implementation of the Park transform enables the module 1958 to express the set of three sinusoidal currents present on the coils 1714 as a direct axis current $I_d$ and a quadrature axis current $I_q$. Since the Park-transformed currents $I_d$, $I_q$ are essentially constant, it becomes possible to control the motor 1500 by using the constant currents $I_d$, $I_q$ rather than the sinusoidal signals actually supplied to the motor 1500.

As shown in FIG. 19, the control apparatus 1950 includes a position control module 1962 that receives a signal indicative of a reference angle ($θ_{ref}$) as well as the actual position signal θ from the encoder read head 1558. Based upon these values the position control module 1962 provides a quadrature axis reference current $I_{q,ref}$ to a current controller and inverse d-q transform module 1966. The current controller within the module 1966 determines differences between the Park-transformed currents $I_d$, $I_q$ and the reference currents $I_{q,ref}$, $I_{d,ref}$ and performs an inverse d-q transform based upon the results. These operations yield command values $V_A$, $V_B$ and $V_C$ which are then mapped into inverter switching signals $S_{A+}$, $S_{A-}$, $S_{B+}$, $S_{B-}$, $S_{C+}$, $S_{C-}$, by switching logic 1970. A 3-phase voltage source inverter 1974 under the control of these switching signals then generates the currents $I_a$, $I_b$, $I_c$ delivered to the coils 1714.

Figure 20:
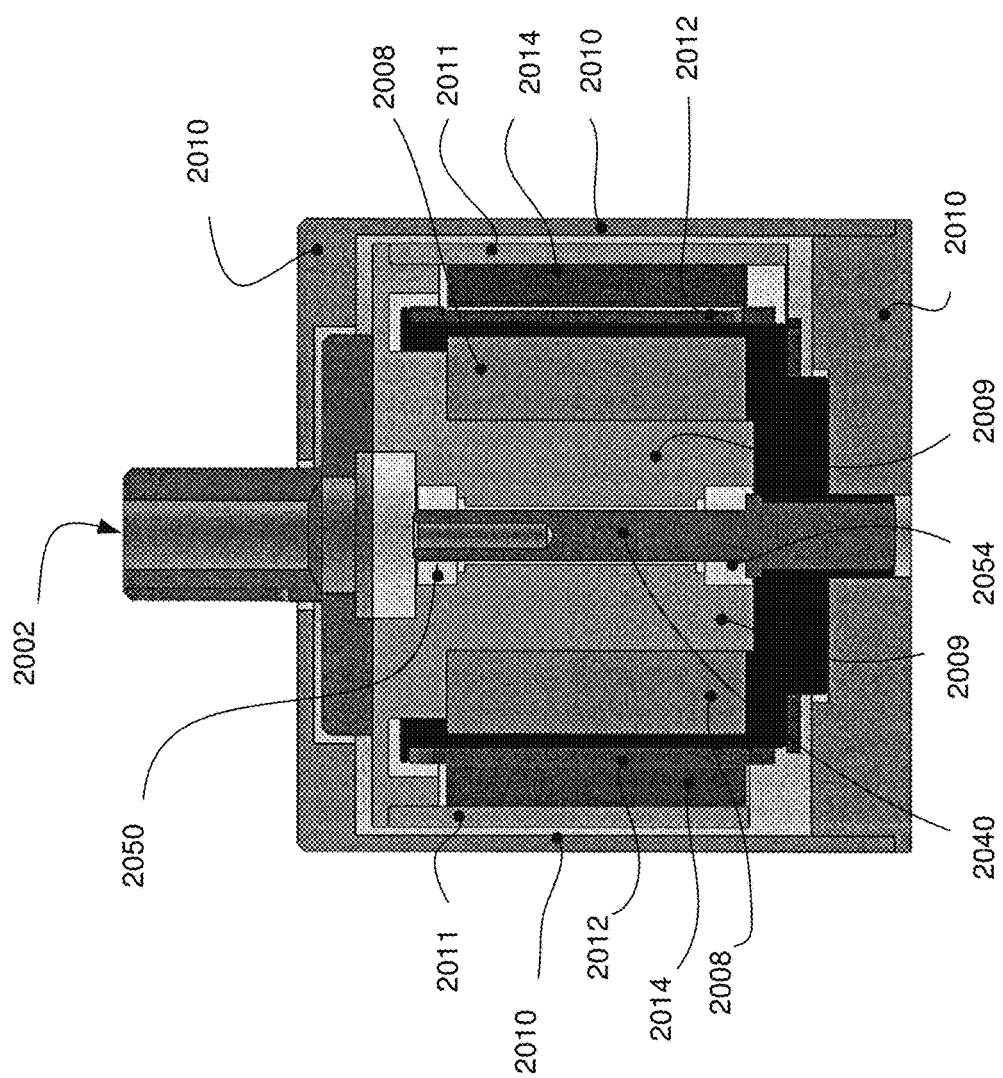
FIG. 20 is a cross-sectional view of a dual rotor magnet apparatus for a brushless electric motor in accordance with an embodiment.

Attention is now directed to FIG. 20, which provides a cross-sectional view of a dual rotor magnet apparatus 2000 for a brushless electric motor in accordance with an embodiment. The dual rotor magnet apparatus 2000 includes a coil assembly having a plurality of coils 2012 arranged in the shape of a cylinder. A dual rotor includes a plurality of outer magnets 2014 configured as a first Halbach cylinder surrounding the coil assembly. A cylindrical support structure 2011 is coupled to and surrounds the plurality of outer magnets 2014. The dual rotor further includes a plurality of inner magnets 2008 arranged as a second Halbach cylinder. As shown, the plurality of coils 2012 of the coil assembly are interposed between the plurality of inner magnets 2008 and the plurality of outer magnets 2014. In the embodiment of FIG. 20 the plurality of inner magnets 2008 are coupled to a core element 2009 accommodating an interior space or chamber 2040.

The apparatus 2000 further includes a housing 2010 which surrounds the rotor and the coil assembly. An output shaft 2002 coupled to, or integral with, the rotor may protrude from an aperture defined by the housing 2010. Radial bearings 2050, 2054 are surrounded by the core element 2009.

Turning now to FIGS. 21A-21E, various views of an alternate embodiment of a brushless electric motor 2100 including a dual magnetic rotor are provided. In the embodiment of FIGS. 21A-21E, the motor 2100 includes a dual magnet rotor assembly having a plurality of rotational components. Specifically, the plurality of rotational components includes a motor output shaft 2102, a plurality of inner magnets 2108 arranged in the shape of a first Halbach cylinder, and a plurality of outer magnets 2114 also cylindrically arranged in a Halbach configuration. The plurality of rotational components further include a cylindrical inner magnet housing 2118 and cylindrical outer magnet housing 2120. The cylindrical inner magnet housing 2118 is coupled to and supports the plurality of inner magnets 2108 and surrounds the rotor shaft 2102. The outer magnet housing 2120 similarly supports the plurality of outer magnets 2114. As shown in FIG. 21A, the motor output shaft 2102 has an inner surface circumscribing and defining a vacuum thru shaft 2130.

The motor 2100 further includes a plurality of non-rotational components including a motor housing 2110 and a cylindrical coil assembly 2112 supported by a coil bobbin 2116. In the embodiment of FIGS. 21A-21E, the cylindrical coil assembly 2112 includes a plurality of multi-layer printed coils arranged to form a cylindrical structure interposed between the plurality of inner magnets 2108 and the plurality of outer magnets 2114. That is, the plurality of outer magnets 2114 surround the coil assembly 2112 and the coil assembly 2112 surrounds the plurality of inner magnets 2108. The motor housing 2110 surrounds the outer magnet housing 2120 of the dual magnet rotor assembly. The output shaft 2102 may protrude from an aperture defined by the motor housing 2110. Radial bearings 2150, 2154 facilitate rotation of the output shaft 2102. An encoder feedback read head 2122 is positioned to read an encoder feedback scale positioned on, for example, the output shaft 2102 or a rotating surface coupled to the output shaft.

During operation of the dual rotor magnet apparatus 2100, the dual magnetic cylinders and the motor output shaft 2102 rotate about a longitudinal axis circumscribed by the vacuum thru shaft 2130. The motor housing 2110, and an end plate 2117 and a top plate 2115 arranged substantially perpendicular to this longitudinal axis, do not rotate during operation of the motor 2100. As shown, the end plate 2117 defines an aperture 2134 in communication with the vacuum thru shaft 2130 and top plate 2115 defines an aperture circumscribing the output shaft 2102. The end plate 2117 may also support an electrical connector 2136 configured to, for example, provide electrical current to the coil assembly 2112 and receive position feedback provided by the encoder feedback read head 2122.

In one embodiment the motor 2100 may be controlled by a controller disposed within a controller housing (not shown) abutting the motor housing 2110. In other embodiments the controller for the motor 2100 may be in essentially any location. For example, the controller may be located remote from the motor 2100 (e.g., a remote computer in network communication with the motor).

Various changes and modifications to the present disclosure will become apparent to those skilled in the art. Such changes and modifications are to be understood as being included within the scope of the present disclosure. The various embodiments of the invention should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to", or other like phrases in some instances shall not be read to mean that the narrower case is intended or required in instances where such broadening phrases may be absent.

The word "exemplary" is used herein to mean "serving as an example or illustration." Any aspect or design described herein as "exemplary" is not necessarily to be construed as preferred or advantageous over other aspects or designs.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented. Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

In conclusion, the present invention provides, among other things, reduced-diameter linear electromagnetic actuators and reduced-cost methods of manufacturing those electromagnetic actuators. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosure as expressed in the claims.

What is claimed is:

1. A printed coil assembly, comprising:
   a flexible dielectric material;
   a patterned top conductive layer formed on a top surface of the flexible dielectric material;
   and
   a patterned bottom conductive layer formed on a bottom surface of the flexible dielectric material, the patterned top conductive layer and the patterned bottom conductive layer forming a plurality of printed coils arranged in a plurality of printed coil rollers disposed to be concentrically arranged in a cylindrical shape;
   wherein each of the plurality of printed coils includes a top layer printed coil disposed within the patterned top conductive layer and a bottom layer printed coil disposed within the patterned bottom conductive layer;
   wherein a first coil pitch of a first set of the plurality of printed coils within a first roller of the plurality of printed coil rollers is less than a second coil pitch of a second set of the plurality of printed coils within a second roller of the plurality of printed coil rollers such that corresponding ones of the plurality of printed coils in the first and second rollers are axially aligned relative to a center of the cylindrical shape.

2. The printed coil assembly of claim 1 wherein the top layer printed coil and the bottom layer printed coil within each of the plurality of printed coils are electrically connected through a top layer conductor extending through a via defined by the flexible dielectric material.

3. The printed coil assembly of claim 2 wherein a first bottom layer printed coil, a second bottom layer printed coil and a third bottom layer printed coil are respectively (i) included within a first printed coil, a second printed coil and a third printed coil of the plurality of printed coils, and (ii) connected to a first terminal start line, a second terminal start line and a third terminal start line.

4. The printed coil assembly of claim 3 wherein a first top layer printed coil, a second top layer printed coil and a third top layer printed coil are respectively (i) included within the first printed coil, the second printed coil and the third printed coil of the plurality of printed coils and (ii) electrically connected to a fourth printed coil, a fifth printed coil and a sixth printed coil of the plurality of printed coils.

5. The printed coil assembly of claim 1 further including a cylindrical bobbin around which the plurality of printed coil rollers are arranged.

6. The printed coil assembly of claim 1 wherein the first set of the plurality of printed coils includes first, second, third, fourth, fifth and sixth printed coils and wherein a first finish wire of the first printed coil is electrically connected to the fourth printed coil, a second finish wire of the second printed coil is electrically connected to the fifth printed coil, and a third finish wire of the third printed coil is electrically connected to the sixth printed coil.

7. The printed coil assembly of claim 6 further including a first inter-coil connector defined within the dielectric material, the first inter-coil connector establishing an electrical connection between the first finish wire and the fourth printed coil.

8. The printed coil assembly of claim 1 further including adhesive transfer tape applied to the patterned bottom conductive layer.

9. The printed coil assembly of claim 1 wherein the patterned top conductive layer includes a first copper layer clad to the top surface of the flexible dielectric material and a first gold layer plated to the first copper layer.

10. The printed coil assembly of claim 9 wherein the patterned bottom conductive layer includes a second copper layer clad to the bottom surface of the flexible dielectric material and a second gold layer plated to the second copper layer.

11. A printed coil arrangement, comprising:
    a flexible circuit material rolled into concentric printed coil rollers wherein each of the concentric printed coil rollers includes a plurality of printed coils and wherein a pitch of the plurality of printed coils within each one of the concentric printed coil rollers is different from a pitch of the plurality of printed coils within any other of the concentric printed coil rollers, the pitches of the printed coils within each of the concentric printed coil rollers being selected such that corresponding ones of the plurality of printed coils in each of the concentric printed coil rollers are axially aligned relative to a center of a cylindrical shape into which the flexible circuit material is rolled;
    a bobbin; and
    an adhesive layer attached to an outer surface of the bobbin and a bottom surface of an innermost one of the concentric printed coil rollers.

12. The printed coil arrangement of claim 11 wherein the adhesive layer is also attached to a bottom surface of each the plurality of concentric printed coil rollers and binds adjacent ones of the plurality of concentric printed coil rollers.

13. The printed coil arrangement of claim 11 wherein the flexible circuit material includes a patterned top conductive layer formed on a top surface of a flexible dielectric material and a patterned bottom conductive layer formed on a bottom surface of the flexible dielectric material, the patterned top conductive layer and the patterned bottom conductive layer forming the plurality of printed coils of each of the plurality of concentric printed coil rollers.

14. The printed coil arrangement of claim 13 wherein each of the plurality of printed coils includes a top layer printed coil disposed within the patterned top conductive layer and a bottom layer printed coil disposed within the patterned bottom conductive layer.

15. The printed coil arrangement of claim 11 wherein a first coil pitch of a first set of the plurality of printed coils within a first roller of the printed coil rollers is less than a second coil pitch of a second set of the plurality of printed coils within a second roller of the plurality of rollers.

16. A method of fabricating a printed coil arrangement, the method including:
  applying, to a top conductive layer of a flexible circuit material and to a bottom conductive layer of the flexible circuit material, one or more masks defining a desired printed coil circuit pattern where the desired printed coil circuit pattern includes multiple rollers having printed coils of variable pitch and wherein the flexible circuit material further includes a flexible dielectric layer sandwiched between the top conductive layer and the bottom conductive layer;
  exposing unmasked portions of the top conductive layer of the flexible circuit material and the bottom conductive layer of the flexible circuit material to acid and removing the unmasked portions of the top conductive layer and the bottom conductive layer;
  applying additional masks to the unmasked portions of the top conductive layer and the bottom conductive layer;
  plating additional conductive material onto the desired printed coil pattern;
  covering a conductive trace resulting from the plating with a printed screen; and
  plating one of gold and a different conducive material onto the additional conductive material of the conductive trace.

17. The method of claim 16 further including applying a cover layer over a portion of the top conductive layer associated with a last of the multiple rollers.

18. The method of claim 16 further including applying, after the plating one of gold and a different conducive material, an adhesive transfer tape to the bottom conductive layer.

19. The method of claim 18 further including:
  winding the multiple rollers around a bobbin;
  bonding, with the adhesive transfer tape, adjacent rollers to each other as the multiple rollers are wound around the bobbin;
  bonding, with the adhesive transfer tape, an innermost one of the multiple rollers to an outer surface of the bobbin.

20. A method of fabricating a printed coil arrangement, the method including:
  etching a flexible circuit material into a plurality of coil rollers wherein each of the plurality of coil rollers includes a plurality of printed coils and wherein a pitch of the plurality of printed coils within each one of the plurality of coil rollers is different from a pitch of the plurality of printed coils within any other of the plurality coil rollers, the pitches of the printed coils within each of the plurality of coil rollers being selected such that corresponding ones of the plurality of printed coils in each of the plurality of coil rollers are axially aligned relative to a center of a cylindrical shape into which the flexible circuit material is rolled;
  applying an adhesive material to a bottom surface of the flexible circuit material;
  positioning a first coil roller of the plurality of coil rollers on an outer surface of a bobbin and bonding the first coil roller to the outer surface using the adhesive material;
  rolling remaining rollers of the plurality of coil rollers onto the first coil roller;
  bonding adjacent coil rollers of the plurality of coil rollers to each other using the adhesive material, thereby creating a rolled and bonded printed coil circuit; and
  curing the rolled and bonded printed coil circuit in an oven.

* * * * *

UNITED STATES PATENT AND TRADEMARK OFFICE
CERTIFICATE OF CORRECTION

| | | |
|---|---|---|
| PATENT NO. | : 11,804,745 B2 | Page 1 of 1 |
| APPLICATION NO. | : 17/170759 | |
| DATED | : October 31, 2023 | |
| INVENTOR(S) | : Edward A. Neff et al. | |

It is certified that error appears in the above-identified patent and that said Letters Patent is hereby corrected as shown below:

On the Title Page

Item (71):
"(71) Applicant: Systems, Machines, Automation Component Corporation, Carlsbad, CA (US)"

Should read:
--(71) Applicant: Systems, Machines, Automation Components Corporation, Carlsbad, CA (US)--

Signed and Sealed this
Third Day of September, 2024

Katherine Kelly Vidal
*Director of the United States Patent and Trademark Office*